United States Patent
Kwon et al.

(10) Patent No.: US 9,628,850 B2
(45) Date of Patent: Apr. 18, 2017

(54) SERVER, HOME DEVICE ACCESS SERVER, TERMINAL, AND HOME DEVICE REMOTE CONTROL SYSTEM INCLUDING THE SAME

(71) Applicant: LG ELECTRONICS INC., Seoul (KR)

(72) Inventors: Ilgeun Kwon, Seoul (KR); Sangyong Lim, Seoul (KR); Dongju Kim, Seoul (KR); Soobin Hwang, Seoul (KR); Jaewan Shin, Seoul (KR); Kidong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/724,450

(22) Filed: May 28, 2015

(65) Prior Publication Data

US 2015/0373401 A1 Dec. 24, 2015

Related U.S. Application Data

(60) Provisional application No. 62/004,897, filed on May 30, 2014.

(30) Foreign Application Priority Data

Sep. 17, 2014 (KR) ........................ 10-2014-0123448

(51) Int. Cl.
*H04N 7/16* (2011.01)
*H04N 21/436* (2011.01)
(Continued)

(52) U.S. Cl.
CPC ... *H04N 21/43615* (2013.01); *H04L 12/2809* (2013.01); *H04L 12/2834* (2013.01);
(Continued)

(58) Field of Classification Search
CPC ......... H04N 21/43615; H04N 21/2809; H04N 21/2834; H04N 21/4131; H04N 21/4227;
(Continued)

(56) References Cited

U.S. PATENT DOCUMENTS

2001/0030597 A1* 10/2001 Inoue .................... G05B 15/02
340/3.7
2001/0056493 A1* 12/2001 Mineo .................... G06Q 30/02
709/227

(Continued)

FOREIGN PATENT DOCUMENTS

WO WO 2013/187097 A1 12/2013

OTHER PUBLICATIONS

European Search Report dated Oct. 28, 2015 issued in Application No. 15001625.1.
(Continued)

*Primary Examiner* — Oleg Asanbayev
(74) *Attorney, Agent, or Firm* — KED & Associates, LLP

(57) ABSTRACT

The server includes a first interface unit to exchange data with a terminal, a second interface unit to exchange data with a home device access server, a third interface unit to receive product information and network information of at least one home device, a storage unit to store the product information and the network information of the at least one home device, and a processor to control network information of the server to be transmitted to the home device access server via the second interface unit and, upon receiving an access request for the at least one home device from the terminal based on a web screen displayed in response to a web browser operated by the terminal, to control the network information of the at least one home device to be transmitted to the terminal.

6 Claims, 27 Drawing Sheets

(51) Int. Cl.
*H04L 12/28* (2006.01)
*H04N 21/41* (2011.01)
*H04N 21/4227* (2011.01)
*H04N 21/4367* (2011.01)
*H04N 21/475* (2011.01)
*H04N 21/4782* (2011.01)
*H04N 21/81* (2011.01)

(52) U.S. Cl.
CPC ..... *H04N 21/4131* (2013.01); *H04N 21/4227* (2013.01); *H04N 21/4367* (2013.01); *H04N 21/4753* (2013.01); *H04N 21/4782* (2013.01); *H04N 21/812* (2013.01); *H04L 2012/2849* (2013.01)

(58) Field of Classification Search
CPC ........... H04N 21/4367; H04N 21/4753; H04N 21/4782; H04N 21/812; H04L 2012/2849
See application file for complete search history.

(56) References Cited

U.S. PATENT DOCUMENTS

| | | | | |
|---|---|---|---|---|
| 2002/0013701 A1* | 1/2002 | Oliver | ................ | G06F 3/16 704/231 |
| 2005/0138193 A1 | 6/2005 | Encarnacion et al. | | |
| 2006/0168264 A1 | 7/2006 | Baba et al. | | |
| 2007/0094352 A1* | 4/2007 | Choi | ................ | H04L 67/02 709/218 |
| 2008/0224834 A1* | 9/2008 | Oosaka | ................ | G05B 15/02 340/286.02 |
| 2009/0327496 A1 | 12/2009 | Klemets et al. | | |
| 2010/0199359 A1* | 8/2010 | Miki | ................ | H04N 7/163 726/30 |
| 2011/0295972 A1* | 12/2011 | Nagatomo | ................ | H04L 12/2812 709/217 |
| 2012/0102161 A1* | 4/2012 | Deprun | ................ | H04L 12/12 709/220 |
| 2012/0239816 A1* | 9/2012 | Carnero Ros | ................ | H04M 15/66 709/227 |
| 2012/0246694 A1* | 9/2012 | Yoshida | ................ | H04N 21/278 725/151 |
| 2012/0331020 A1* | 12/2012 | Morishita | ................ | G06F 17/3028 707/822 |
| 2013/0191834 A1* | 7/2013 | Tanaka | ................ | G06F 9/4843 718/102 |
| 2014/0237520 A1* | 8/2014 | Rothschild | ................ | H04N 21/236 725/88 |
| 2015/0156270 A1 | 6/2015 | Teraoka et al. | | |

OTHER PUBLICATIONS

European Search Report dated Feb. 3, 2016 issued in Application No. 15001625.1.

* cited by examiner

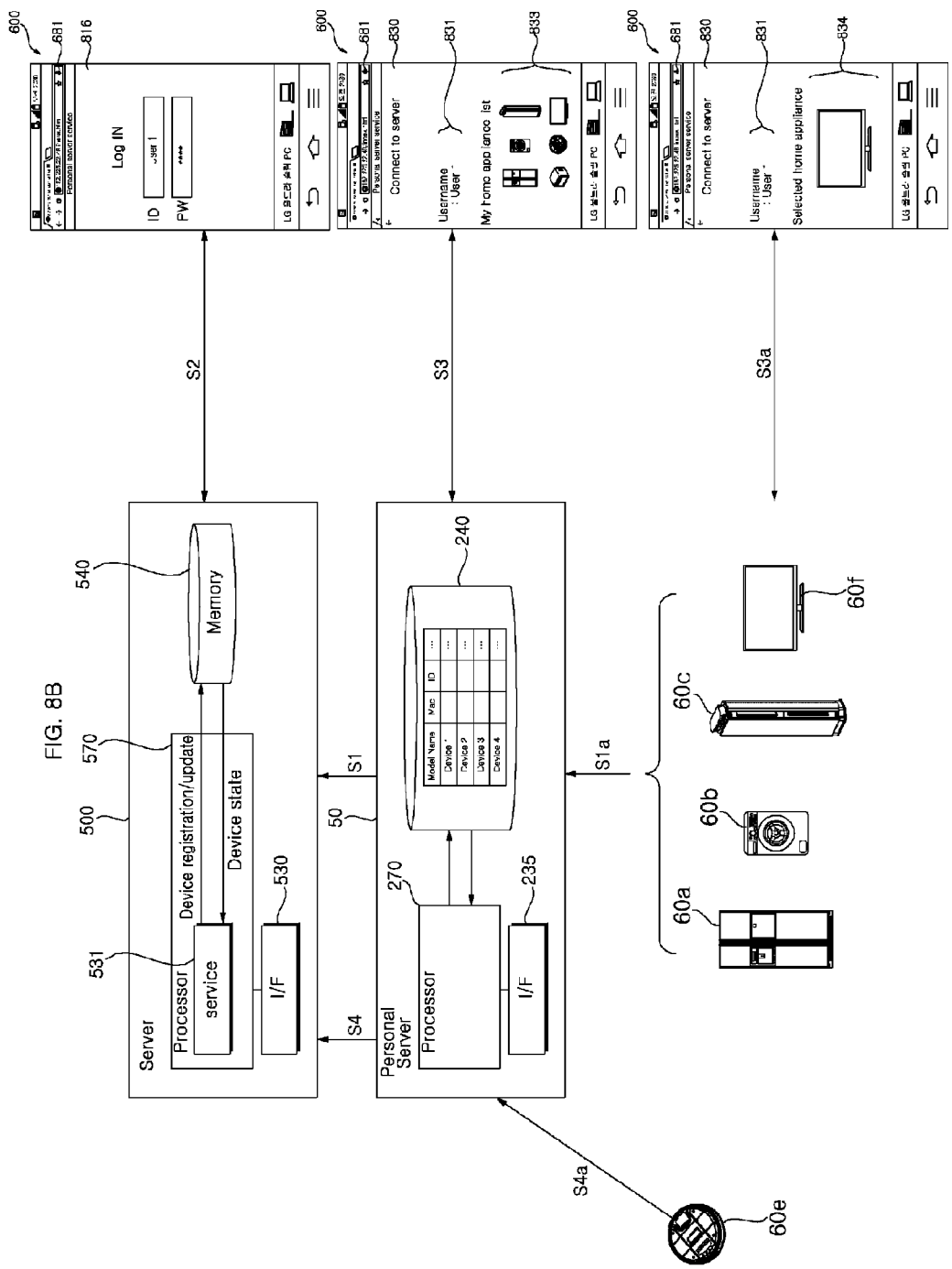

FIG. 8D

| Mac Address | Product ID | Product Name | Serial Number | Model Name | Body |
|---|---|---|---|---|---|
| 00-19-D1-4E-F2-86 | 10351314 | Refrigerator | 2345171 | DIOS R-T823LBLDU | ..... |
| D8-17-A1-4C-12-34 | 40451223 | Washer | 2345123 | TROMM RN1044A | ..... |
| 17-3C-5C-7D-AC-24 | 48823966 | TV | 4595123 | Xcanvas 84LM9600 | ..... |
| A3-D7-4F-7G-AC-46 | 11923845 | Air conditioner | 9223541 | whisen FQ167DWMSDW | ..... |

716

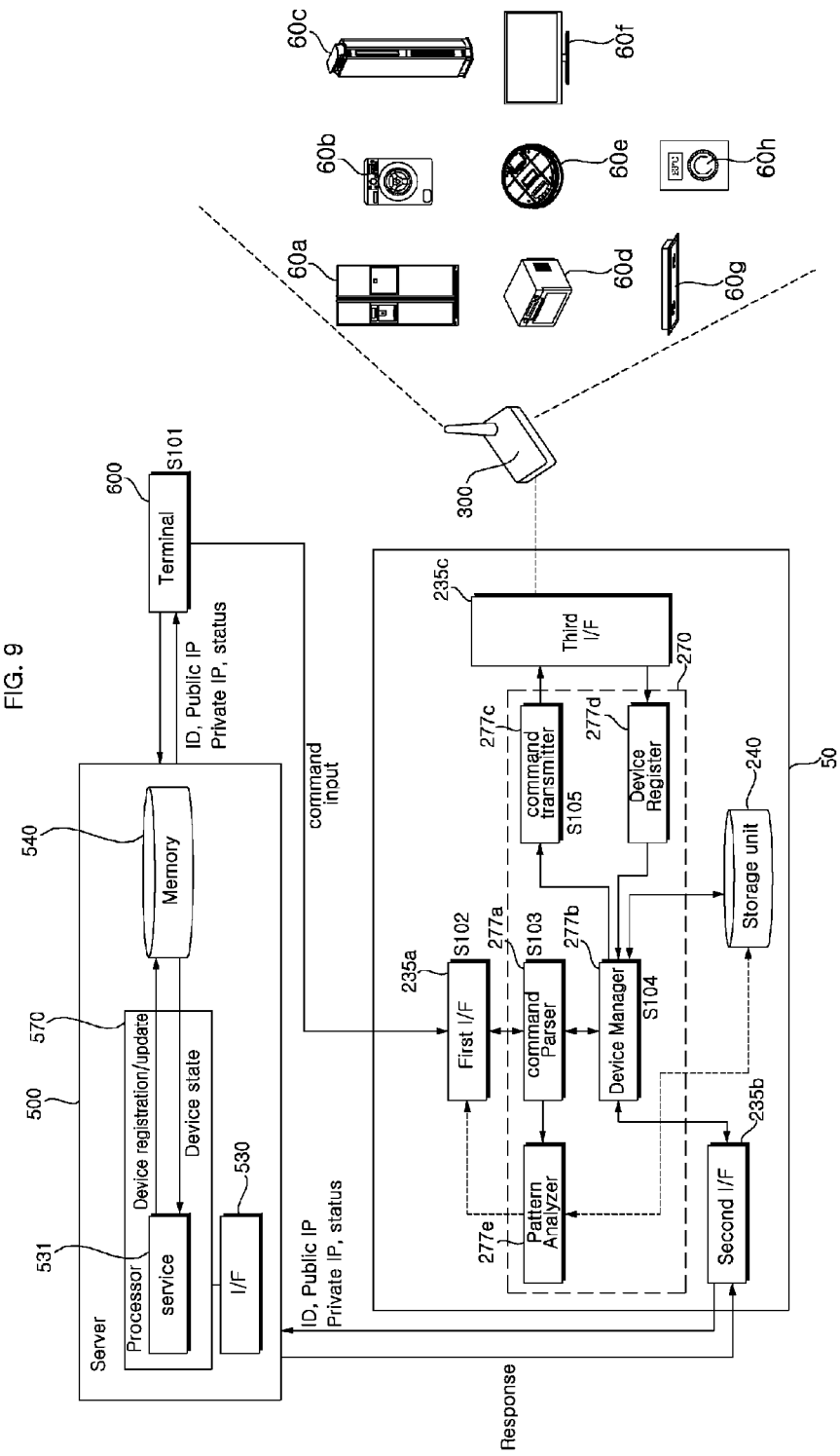

SERVER, HOME DEVICE ACCESS SERVER, TERMINAL, AND HOME DEVICE REMOTE CONTROL SYSTEM INCLUDING THE SAME

CROSS-REFERENCE TO RELATED APPLICATION

This application claims the priority the benefit of U.S. Provisional Application No. 62/004,897 filed on May 30, 2014 in the United States Patent and Trademark Office, and the priority benefit of Korean Patent Application No. 10-2014-0123448, filed on Sep. 17, 2014 in the Korean Intellectual Property Office, the disclosure of which is incorporated herein by reference.

BACKGROUND OF THE INVENTION

1. Field of the Invention

The present invention relates to a server, a home device access server, a terminal, and a home device remote control system including the same, and more particularly to a server, a home device access server, a terminal, and a home device remote control system that is capable of easily and conveniently remotely controlling a home device through the terminal.

2. Description of the Related Art

A refrigerator, which is one of the home devices placed in a house or a building, stores food for users. A laundry treatment apparatus, which is another home device, treats laundry. An air conditioner, which is yet another home device, adjusts indoor temperature. A cooker, which is yet another home device, cooks food.

With the development of various communication schemes, various methods of improving user convenience with home devices through communication have been researched.

SUMMARY OF THE INVENTION

It is an object of the present invention to provide a server, a home device access server, a terminal, and a home device remote control system that is capable of easily and conveniently remotely controlling a home device through the terminal.

In accordance with an aspect of the present invention, the above and other objects can be accomplished by the provision of a server including a first interface unit to exchange data with a terminal, a second interface unit to exchange data with a home device access server, a third interface unit to receive product information and network information of at least one home device, a storage unit to store the product information and the network information of the at least one home device, and a processor to control network information of the server to be transmitted to the home device access server via the second interface unit and, upon receiving an access request for the at least one home device from the terminal based on a web screen displayed in response to a web browser operated by the terminal, to control the network information of the at least one home device to be transmitted to the terminal.

In accordance with another aspect of the present invention, there is provided a home device access server including a storage unit to store a personal server list of personal servers including home device information and network information corresponding to the personal server list, an interface unit to receive an access request from a terminal in response to a web address input to a web screen displayed in response to a web browser operated by the terminal and to receive login information from the terminal, and a processor to control personal server list information corresponding to the login information to be transmitted to the terminal and, upon receiving a request for information regarding a specific personal server selected from the personal server list from the terminal, controlling network information of the personal server to be transmitted to the terminal, wherein the network information includes public IP information and private IP information of the personal server.

In accordance with another aspect of the present invention, there is provided a terminal including a display, a communication unit to exchange data with a server or a home device access server, and a controller to control a web browser to be operated such that a web screen is displayed on the display, to control the terminal to access the home device access server in response to a web address input to the web screen, to control to access the server based on network information of the server received from the home device access server, and to remotely control at least one home device using product information and network information of the at least one home device managed by the server.

In accordance with a further aspect of the present invention, there is provided a home device remote control system including a terminal, a home device access server to receive an access request from the terminal in response to a web address input to a web screen displayed in response to a web browser operated by the terminal, to control personal server list information corresponding to login information from the terminal to be transmitted to the terminal, and, upon receiving a request for information regarding a specific personal server selected from the personal server list from the terminal, to transmit network information of the personal server to the terminal, and a server to store product information and network information of at least one home device, to provide a home device list for the at least one home device according to an access request from the terminal based on the web screen displayed in response to the web browser operated by the terminal, and, upon receiving an access request for any one home device selected from the home device list, to provide the network information of the selected home device to the terminal.

BRIEF DESCRIPTION OF THE DRAWINGS

The above and other objects, features and other advantages of the present invention will be more clearly understood from the following detailed description taken in conjunction with the accompanying drawings, in which:

FIGS. 8A to 14B are reference views illustrating the operation of the home device remote control system of FIG. 1.

DETAILED DESCRIPTION OF THE PREFERRED EMBODIMENTS

Exemplary embodiments of the present invention will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

Figure 1:
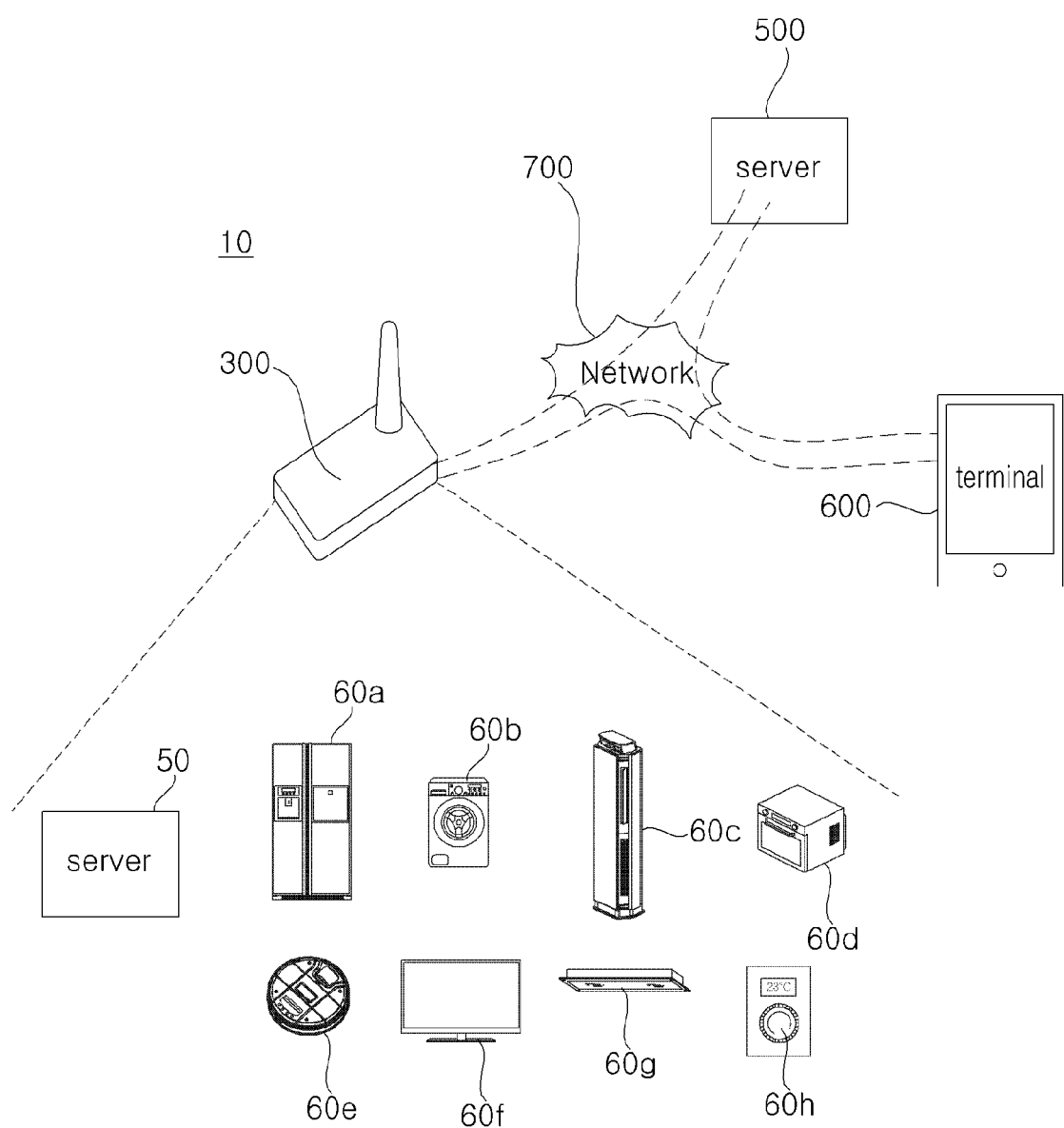
FIG. 1 is a view showing a home device remote control system according to an embodiment of the present invention.

FIG. 1 is a view showing a home device remote control system according to an embodiment of the present invention.

Referring to FIG. 1, a home device remote control system 10 according to an embodiment of the present invention may include a terminal 600, a home device access server 500, an access point (AP) 300, a personal server 50, and home devices 60a to 60h.

The home device access server 500 may receive an access request from the terminal 600 in response to a web address input to the terminal 600, transmit to the terminal 600 personal server list information corresponding to login information from the terminal 600, and, upon receiving a request for information regarding a specific personal server 50 of the personal server list from the terminal 600, transmit network information of the personal server 50 to the terminal 600.

The network information of the personal server 50 may include public IP information and private IP information of the personal server 50.

The personal server 50 may periodically transmit the network information of the personal server 50 to the home device access server 500.

On the other hand, the personal server 50 may periodically transmit the network information of the personal server 50 to the home device access server 500 whenever the personal server 50 is powered on.

The personal server 50 may store product information and network information of at least one home device, provide a home device list including at least one home device to the terminal 600 in response to an access request from the terminal 600, and upon receiving an access request for at least one home device of the home device list, provide network information of at least one home device to the terminal 600.

In addition, the personal server 50 may transmit product information of at least one home device to the home device access server 500. Alternatively, the personal server 50 may periodically transmit product information and network information of at least one home device to the home device access server 500.

The personal server 50 may store a home device list including at least one home device.

As shown in FIG. 1, a refrigerator 60a, a washer 60b, an air conditioner 60c, a cooker 60d, a robot cleaner 60e, a TV 60f, a lighting device 60g, and a temperature controller 60h are provided as the home devices.

On the other hand, a security apparatus, such as a security camera, an electronically openable and closable door, an electronically openable and closable window, an air purifier, a sound output apparatus, a game console, a settop box, an electronic picture frame, an energy storage system (ESS), a digital camera, a scent generator, a vehicle may be further provided as the home devices.

The refrigerator 60a, the washer 60b, the air conditioner 60c, the cooker 60d, the robot cleaner 60e, the TV 60f, the lighting device 60g, and the temperature controller 60h may perform data communication with the personal server 50 via the AP 300. For example, the home devices may perform Wi-Fi communication with the personal server 50.

Meanwhile, the personal server 50 may receive product information and network information (MAC information, etc.) of the refrigerator 60a, the washer 60b, the air conditioner 60c, the cooker 60d, the robot cleaner 60e, the TV 60f, the lighting device 60g, and the temperature controller 60h, and manage them as a home device list. In addition, the personal server 50 may store the home device list in a storage unit.

When a new home device, such as a dryer or a vacuum cleaner, is added, the personal server 50 may further receive product information and network information (MAC information, etc.) of the added home device, and update the home device list.

The terminal 600 may operate a web browser, which is no additional application, for remotely controlling the home device, and transmit an access request to the home device access server 500 when a web address for accessing the home device access server 500 is input on a web operating screen. In addition, the terminal 600 may receive information corresponding to the access request from the home device access server 500, and display a screen for accessing the personal server.

When login information is input in a state in which the screen for accessing the personal server is displayed, the terminal 600 may transmit the login information to the home device access server 500. After completion of login, the terminal 600 may receive personal server list information from the home device access server 500. In addition, the terminal 600 may display a personal server list screen for the received personal server list information.

Meanwhile, in a case in which a specific personal server is selected on the personal server list screen, the terminal 600 may transmit an information request for the specific personal server. Specifically, the terminal 600 may transmit a request for network information of the personal server.

Meanwhile, upon receiving the network information of the personal server from the home device access server 500, the terminal 600 may transmit an access request to the personal server 50 using the received network information of the personal server. In response to the access request, the personal server 50 may transmit the home device list information stored therein to the terminal 600. As a result, the terminal 600 may display the home device list managed by the personal server 50.

Meanwhile, upon receiving the home device list information, the terminal 600 may also receive the product information and the network information of the home devices.

Meanwhile, in a case in which any one home device is selected from the home device list, the terminal 600 may display a screen for remotely controlling the selected home device. In addition, in a case in which a remote control command for the corresponding home device is issued, the terminal 600 may transmit the remote control command to the corresponding home device via the personal server 50 using the network information of the corresponding home device.

For example, in a case in which a power on command for the TV 60f is issued, the terminal 600 may transmit the power on command to the TV 60*f* via a network 700, the AP 300, and the personal server 50.

In another example, in a case in which a power on command for the TV 60*f* is issued, the terminal 600 may transmit the power on command to the TV 60*f* via the network 700 and the AP 300. That is, the terminal 600 may directly transmit the power on command to the TV 60*f* not via the personal server 50.

As a result, it is possible to easily and conveniently remotely control the home device through the web browser using the terminal 600 without installation of an additional application.

Figure 2:
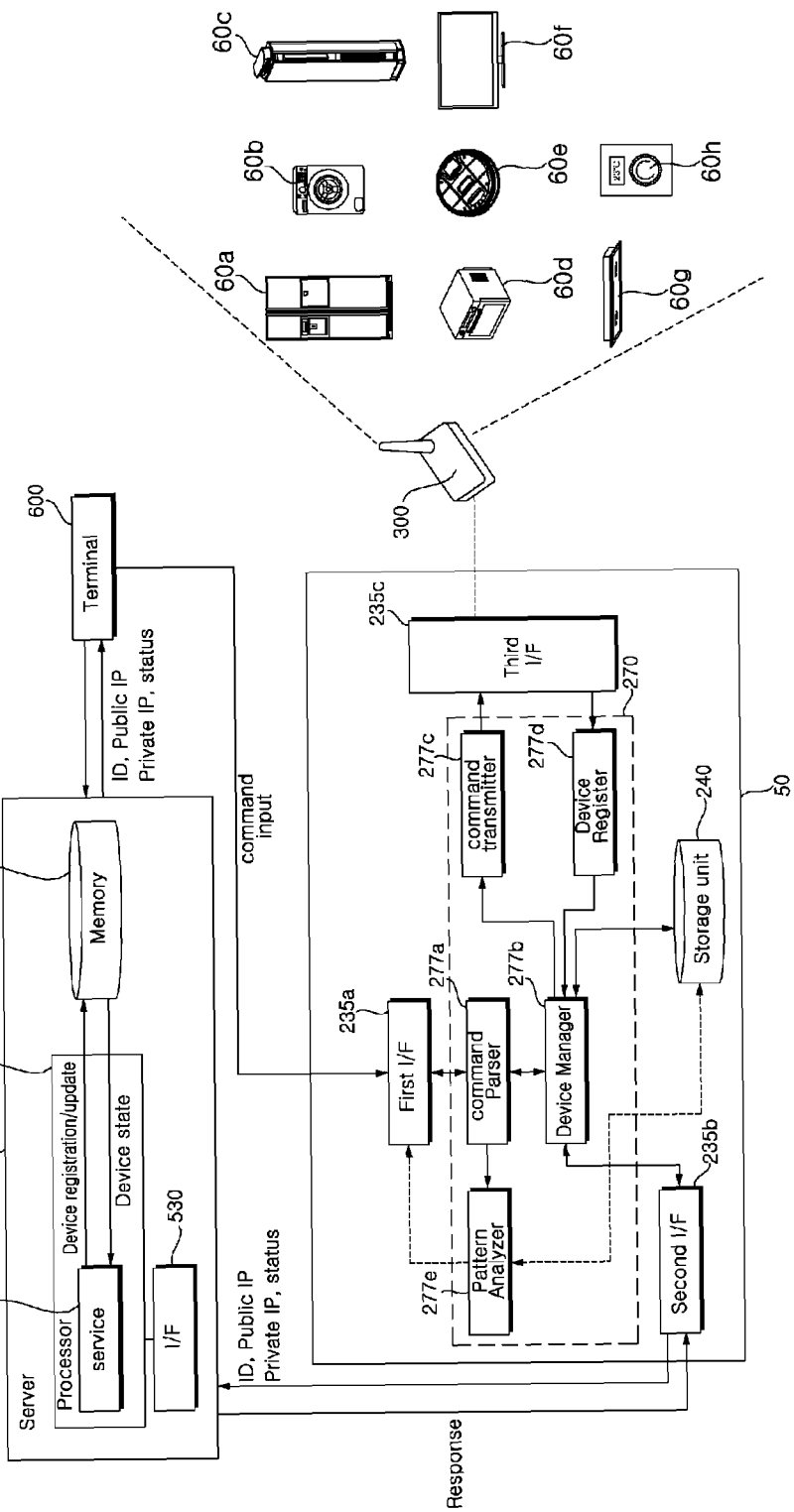
FIG. 2 is an internal block diagram of a home device access server and a personal server shown in FIG. 1.

FIG. 2 is an internal block diagram of the home device access server and the personal server shown in FIG. 1.

Referring to FIG. 2, the home device access server 500 may be a server that provides accessible information to a home device. To this end, the home device access server 500 may include a processor 570, an interface unit 530, and a memory 540.

The interface unit 530 may exchange data with the personal server 50 or the terminal 600.

The interface unit 530 may receive an access request from the terminal 600 in response to a web address input to the terminal 600, and receive login information from the terminal 600. In addition, the interface unit 530 may transmit personal server list information corresponding to the login information to the terminal 600.

The interface unit 530 may receive a request for information regarding a specific personal server 50 of the personal server list from the terminal 600, and transmit network information of the personal server 50 to the terminal 600.

On the other hand, the interface unit 530 may periodically receive from the personal server 50 the network information of the personal server 50.

Meanwhile, the interface unit 530 may receive a home device list managed by the personal server 50. At this time, the interface unit 530 may also receive product information and network information (MAC information, etc.) of the home devices.

The processor 570 may control the interface unit 530 and the memory 540.

For example, the processor 570 may control information regarding a screen for accessing the personal server to be transmitted to the terminal 600 in response to the access request from the terminal 600, and control personal server list information corresponding to the received login information to be transmitted to the terminal 600.

In addition, the processor 570 may control information, especially network information, of a specific personal server to be transmitted to the terminal 600.

The memory 540 may store the network information of the personal server. For example, the memory 540 may store the network information, such as public IP information, private IP information, device information, and account ID information, of the personal server.

Meanwhile, the memory 540 may store a home device list managed by the personal server 50. At this time, the memory 540 may also store product information and network information (MAC information, etc.) of the home devices.

On the other hand, the home device access server 500 may periodically access the personal server 50 to receive and update the network information of the personal server 50.

Unlike the AP 300, which always remains powered on, the personal server 50 may be frequently powered off. As a result, the private IP information of the personal server 50 may be frequently changed. In order to update the private IP information of the personal server 50, therefore, the home device access server 500 may frequently access the personal server 50, especially whenever the personal server 50 is powered on, to receive new network information, especially private IP information, of the personal server 50.

In addition, the home device access server 500 may store the new network information as updated network information for the corresponding personal server 50.

The home device access server 500 may transmit the updated network information to the terminal 600 according to a request of the terminal 600. The terminal 600 may receive the updated network information from the home device access server 500 not through an additional procedure such that the terminal 600 can easily and conveniently access the personal server 50.

Upon providing information for accessing the personal server, on the other hand, the home device access server 500 may provide advertisement information. In addition, when personal server list information is provided after login, the home device access server 500 may also provide the advertisement information.

At this time, the home device access server 500 may change the kind, attribute, etc. of the advertisement information provided before and after login. That is, the home device access server 500 may provide customized advertisement information to a corresponding user after login.

Meanwhile, the personal server 50 may include a first interface unit 235*a* for exchanging data with the terminal 600, a second interface unit 235*b* for exchanging data with the home device access server 500, a third interface unit 235*c* for receiving product information and network information of at least one home device, a storage unit 240 for storing the product information and the network information of the at least one home device, and a processor 270 for controlling the product information and the network information to be transmitted to the home device access server 500 via the second interface unit 235*b* and, upon receiving an access request for at least one home device from the terminal 600, controlling network information of the corresponding home device to be transmitted to the terminal 600.

The processor 270 may receive an access request from the terminal 600 in response to a personal server 50 selected on a web screen operated in the terminal 600. When the terminal 600 accesses the personal server 50, the processor 270 may control home device list information including product information and network information of at least one home device to be transmitted to the terminal 600. In a case in which an access request for any one home device of the home device list is received, the processor 270 may control the network information of the corresponding home device to be transmitted to the terminal 600.

The third interface unit 235*c* may further receive product information and network information of an added home device. The processor 270 may control the product information and the network information of the added home device to be stored in the storage unit 240 in a state in which the product information and the network information of the added home device are included in the home device list.

The processor 270 may control product information of at least one home device to be transmitted to the home device access server 500 via the second interface unit 235*b*.

Meanwhile, the processor 270 may include a command parser 277*a* for parsing a remote control command from the terminal 600, a command transmitter 277*c* for transmitting the parsed command, and a device manager 277*b* for controlling the command parser 277*a* and the command transmitter 277*c*.

In addition, the processor 270 may further include a pattern analyzer 277e for analyzing a pattern of the remote control command received from the terminal 600, and a device register 277d for receiving product information and network information of a home device and transmitting the received product information and network information of the home device to the device manager 277b.

In a case in which the pattern analyzed by the pattern analyzer 277e appears in a predetermined cycle or for a predetermined number of times, the pattern may be used to provide a customized function.

On the other hand, the processor 270 may control network information of the personal server 50 to be transmitted to the home device access server 500 when the personal server 50 is powered on.

Meanwhile, the personal server 50 described herein may be a server that provides information for remotely controlling a home device. For example, the personal server 50 may be a remote access control (RAC) server, Consequently, a remote control command input through the terminal 600 may be transmitted to a specific one of the home devices 60a to 60h via the personal server 50 and the AP 300. As a result, it is possible to easily and conveniently remotely control the home device using the terminal 600, especially a web screen based on the web browser.

Meanwhile, the personal server 50 may be embodied as a video provision apparatus having both a TV function and a PC function.

That is, in a case in which the personal server 50 is embodied as a video provision apparatus that is capable of providing a broadcast video, the personal server 50 may further include a broadcast reception unit 105 (see FIG. 4) for receiving a broadcast signal. When the terminal 600 remotely accesses the personal server 50, the processor 270 may control a shared content list stored in the storage unit 240 to be transmitted to the terminal 600 according to a request of the terminal 600. In a case in which a specific broadcast content item is selected from the shared content list, the processor 270 may control the selected broadcast content item to be transmitted to the terminal 600.

In addition, in a case in which a broadcast recording command is received from the terminal 600, the processor 270 may control the broadcast reception unit 105 to receive a broadcast signal of a corresponding channel in response to the broadcast recording command, and control a stream corresponding to the broadcast signal to be stored in the storage unit 240.

On the other hand, in a case in which a broadcast watching command is received from the terminal 600, the processor 270 may control the broadcast reception unit 105 to receive a broadcast signal of a corresponding channel in response to the broadcast watching command, transcode a stream corresponding to the broadcast signal, and control the transcoded stream to be transmitted to the terminal 600 via the first interface unit 235a.

Meanwhile, in a case in which the personal server 50 is embodied separately from the TV 60f, when a broadcast recording command is received from the terminal 600, the processor 270 may transmit the broadcast recording command to the TV 60f. On the other hand, in a case in which a broadcast watching command is received from the terminal 600, the processor 270 may transmit the broadcast watching command to the TV 60f.

Hereinafter, a video provision apparatus, which is an embodiment of the personal server 50, will be described with reference to FIGS. 3 and 4.

Figure 3:
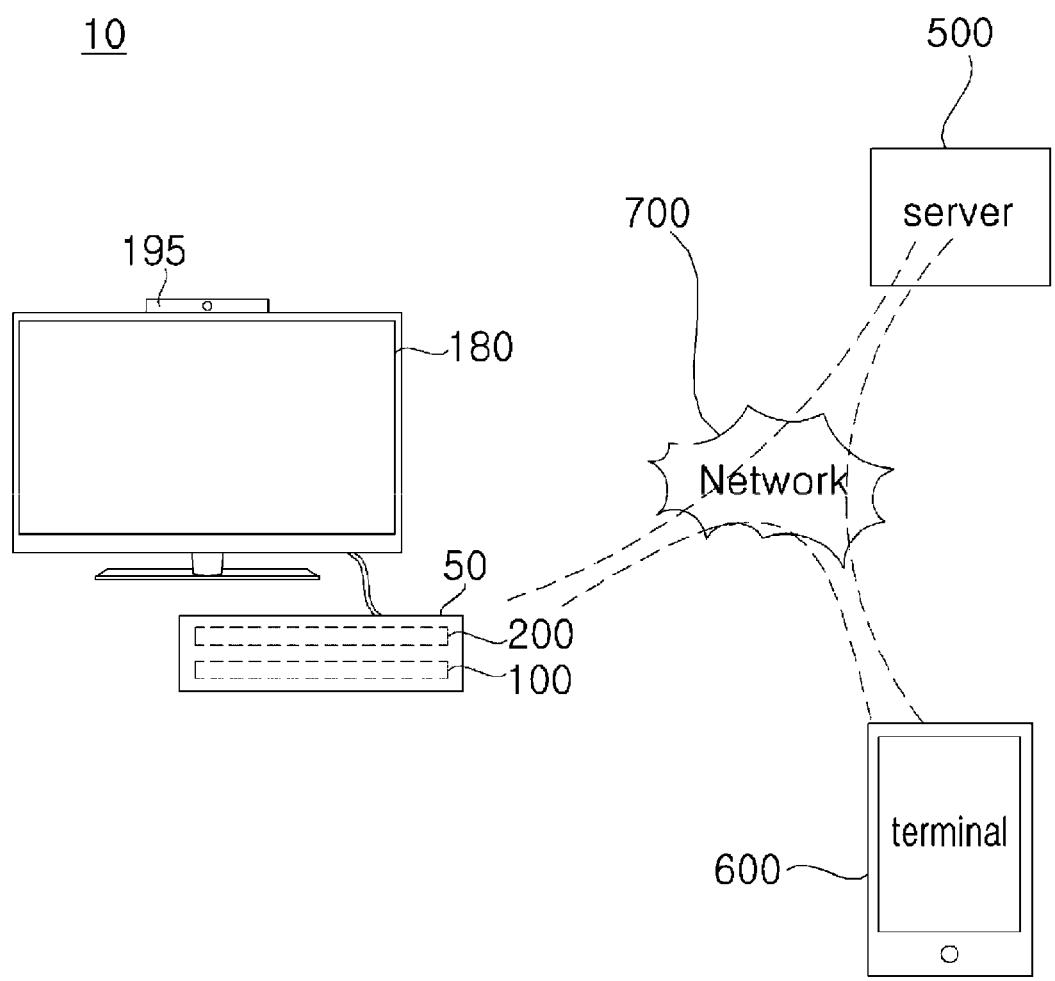
FIG. 3 is a view showing a home device remote control system including a video provision apparatus, which is one example of the personal server shown in FIG. 1.

FIG. 3 is a view showing a home device remote control system including a video provision apparatus, which is one example of the personal server shown in FIG. 1.

Referring to FIG. 3, a home device remote control system 10 according to an embodiment of the present invention may include a terminal 600, a home device access server 500, and a personal server, i.e. a video provision apparatus 50.

The terminal 600 may access the home device access server 500 in response to a web address input to the terminal 600, receive information for accessing the personal server from the home device access server 500, and display a screen for accessing the personal server.

In a case in which login information is input in the personal server access screen, the terminal 600 may transmit the login information to the home device access server 500, receive personal server list information corresponding to the login information from the home device access server 500, and display a personal server list screen.

Meanwhile, in a case in which any one personal server is selected on the personal server list screen, the terminal 600 may request network information of the selected personal server from the home device access server 500.

The home device access server 500 may transmit the requested network information of the personal server to the terminal 600, and the terminal 600 may receive the network information of the personal server from the home device access server 500. Consequently, the terminal 600 may access the selected personal server using the received network information.

At this time, the personal server may correspond to the video provision apparatus 50 shown in FIG. 3. That is, in a case in which any one personal server is selected, the terminal 600 may access the video provision apparatus 50.

The video provision apparatus 50, which is an apparatus for providing a video, may provide a specific video to an external apparatus.

In particular, the video provision apparatus 50 may receive a broadcast signal, process the received broadcast signal, and stream broadcast content to the outside. Alternatively, the video provision apparatus 50 may transmit content stored in a memory to the outside. That is, the video provision apparatus 50 may function as a personal server.

Meanwhile, the video provision apparatus 50 may have network information, which is necessary to transmit content to the outside. The network information may include public IP information and private IP information.

The video provision apparatus 50 may access the network 700 via the AP 300 to access the home device access server 500 or the terminal 600.

At this time, the network information corresponding to the AP 300 may include public IP information.

Meanwhile, the video provision apparatus 50, which access the AP 300 in a wired or wireless fashion, constitutes the network in the AP 300. Consequently, private IP information from the AP 300 may be assigned to the video provision apparatus 50. The network information corresponding to the video provision apparatus 50 in the AP 300 may include private IP information.

That is, the video provision apparatus 50 may have public IP information corresponding to the AP 300 and private IP information corresponding to the video provision apparatus 50 to access the home device access server 500 or the terminal 600.

In conclusion, when any one personal server is selected, the terminal 600 may receive the network information, i.e. the public IP information and the private IP information, of the video provision apparatus 50 corresponding to the personal server from the home device access server 500, and access the video provision apparatus 50 using the received network information.

Subsequently, the terminal 600 may receive shared content list information from the accessed video provision apparatus 50, and display a shared content list screen. In a case in which a user selects any one content item from the shared content list, the terminal 600 may request the selected content item from the accessed video provision apparatus 50 to receive the content item.

As a result, the user of the terminal 600 may remotely access the personal server, i.e. the video provision apparatus 50, receive desired content from the video provision apparatus 50, and easily and conveniently watch the received content. Consequently, user convenience may be improved.

In particular, it is sufficient to input only a web address on the web browser without installation of an additional application in the terminal 600 in order to receive a screen for accessing the personal server from the personal server 50. After login, the terminal 600 may receive a personal server list screen, and easily and conveniently access a selected personal server, i.e. the video provision apparatus 50.

In particular, the terminal 600 may receive the private IP information of the video provision apparatus 50 from the home device access server 500 such that the terminal 600 can easily and conveniently access the video provision apparatus 50.

Meanwhile, the terminal 600 may include a fixed terminal or a mobile terminal.

Meanwhile, in a case in which the terminal 600 accesses the home device access server 500 through input of the web address, the home device access server 500 may provide a screen for accessing the personal server to the terminal 600.

The home device access server 500 may have a plurality of web addresses. Consequently, the home device access server 500 may provide a server access screen of a different user interface per web address.

For example, in a case in which a web address for a PC is input, the home device access server 500 may provide a server access screen corresponding to a first resolution to the terminal 600. On the other hand, in a case in which a web address for a mobile device is input, the home device access server 500 may provide a server access screen corresponding to a second resolution lower than the first resolution to the terminal 600.

In another example, in a case in which a first web address is input, the home device access server 500 may provide a first server access screen corresponding to the first web address to the terminal 600. On the other hand, in a case in which a second web address is input, the home device access server 500 may provide a second server access screen corresponding to the second web address to the terminal 600.

Upon receiving login information from the terminal 60, the home device access server 500 may provide personal server list information corresponding to the login information to the terminal 600.

In a case in which the personal server list corresponding to the login information is prestored, the home device access server 500 may provide the personal server list information corresponding to the login information to the terminal 600.

The memory 540 of the home device access server 500 may store login information of individuals, apparatus information of the video provision apparatus, personal server list information corresponding to the login information, and network information of each personal server. The network information may include public IP information and private IP information as described above.

Upon receiving a request for network information of a specific personal server selected from the personal server list from the terminal 600, the home device access server 500 may transmit network information, i.e. public IP information and private IP information, of the corresponding personal server to the terminal 600. In addition, the home device access server 500 may further transmit device information and account ID information of the personal server to the terminal 600.

Meanwhile, the home device access server 500 may frequently access the personal server, i.e. the video provision apparatus 50, to receive and update the network information of the video provision apparatus 50.

Unlike the AP 300, which always remains powered on, the video provision apparatus 50 is powered on only when in use. As a result, the private IP information of the video provision apparatus 50 may be frequently changed. In order to update the private IP information of the video provision apparatus 50, therefore, the home device access server 500 may frequently access the video provision apparatus 50, especially whenever the video provision apparatus 50 is powered on, to receive new network information, especially private IP information, of the video provision apparatus 50.

In addition, the home device access server 500 may store the new network information as updated network information for the corresponding video provision apparatus 50.

The home device access server 500 may transmit the updated network information to the terminal 600 according to a request of the terminal 600. The terminal 600 may receive the updated network information from the home device access server 500 not through an additional procedure such that the terminal 600 can easily and conveniently access the video provision apparatus 50.

Upon providing information for accessing the personal server, on the other hand, the home device access server 500 may provide advertisement information. In addition, when personal server list information is provided after login, the home device access server 500 may also provide the advertisement information.

At this time, the home device access server 500 may change the kind, attribute, etc. of the advertisement information provided before and after login. That is, the home device access server 500 may provide customized advertisement information to a corresponding user after login.

Meanwhile, the video provision apparatus 50 may have a first circuit board 100 including a broadcast reception unit 105 (see FIG. 4) and a second circuit board 200 including a storage unit 240 (see FIG. 4) having a large-capacity storage space.

The first circuit board 100 and the second circuit board 200 may be detachably mounted in the video provision apparatus 50.

Meanwhile, the first circuit board 100 and the second circuit board 200 may exchange data with each other via a first interface unit 125 and a second interface unit 225.

The second circuit board 200 may transmit a signal for a background image or a video or content reproduced by the second circuit board 200 to the first circuit board 100. The first circuit board 100 may transmit a control signal, a broadcast signal to be stored, or a broadcast video to be stored to the second circuit board 200.

In particular, in a case in which there is an input for broadcast storage, the first circuit board 100 may transmit a processed broadcast signal or broadcast video to the second circuit board 200.

The first circuit board 100 may be named a TV board, and the second circuit board 200 may be named a PC board.

In particular, the second circuit board 200 may be detachably mounted in the video provision apparatus 50 such that parts of the second circuit board 200 can be upgraded.

In an embodiment of the present invention, on the other hand, the video provision apparatus 50 may be a user interface, which may be easily and conveniently used by a user, and may provide a home screen including a TV screen and a PC screen.

Meanwhile, the first circuit board 100 and the second circuit board 200 may be separated from each other such that when any one of the circuit boards 100 and 200, especially the second circuit board 200, is defective, a broadcast video can be stably provided through the first circuit board 100.

A processor of the second circuit board 200 may be superior to that of the first circuit board 100 in terms of a processing speed, a processing capacity, etc. For this reason, the second circuit board 200 may execute high performance functions, such as video capture using a camera, gesture recognition, web access, and game execution. In addition, the second circuit board 200 may provide a screen for each function to the first circuit board 100.

Meanwhile, FIG. 3 shows that the video provision apparatus 50 includes a display 180 and a camera 195. In another embodiment, however, the display 180 may not be included in the video provision apparatus 50. In a case in which the display 180 is included in the video provision apparatus 50, the video provision apparatus 50 may be named a video display apparatus.

The display 180 may be a plasma display panel (PDP), a liquid crystal display (LCD), an organic light emitting device (OLED), or a flexible display. In addition, the display 180 may be a three-dimensional (3D) display.

On the other hand, the display 180 may be a touchscreen. In this case, the display 180 may be used as an input device as well as an output device.

The camera 195 may take a video of a user. The camera 195 may include a single camera unit. However, the present invention is not limited thereto. For example, the camera 195 may include a plurality of camera units. Meanwhile, the camera 195 may be embedded in the upper part of the display 180 or may be provided separately from the display 180. Video information taken by the camera 195 may be input to the video provision apparatus 50.

Figure 4:
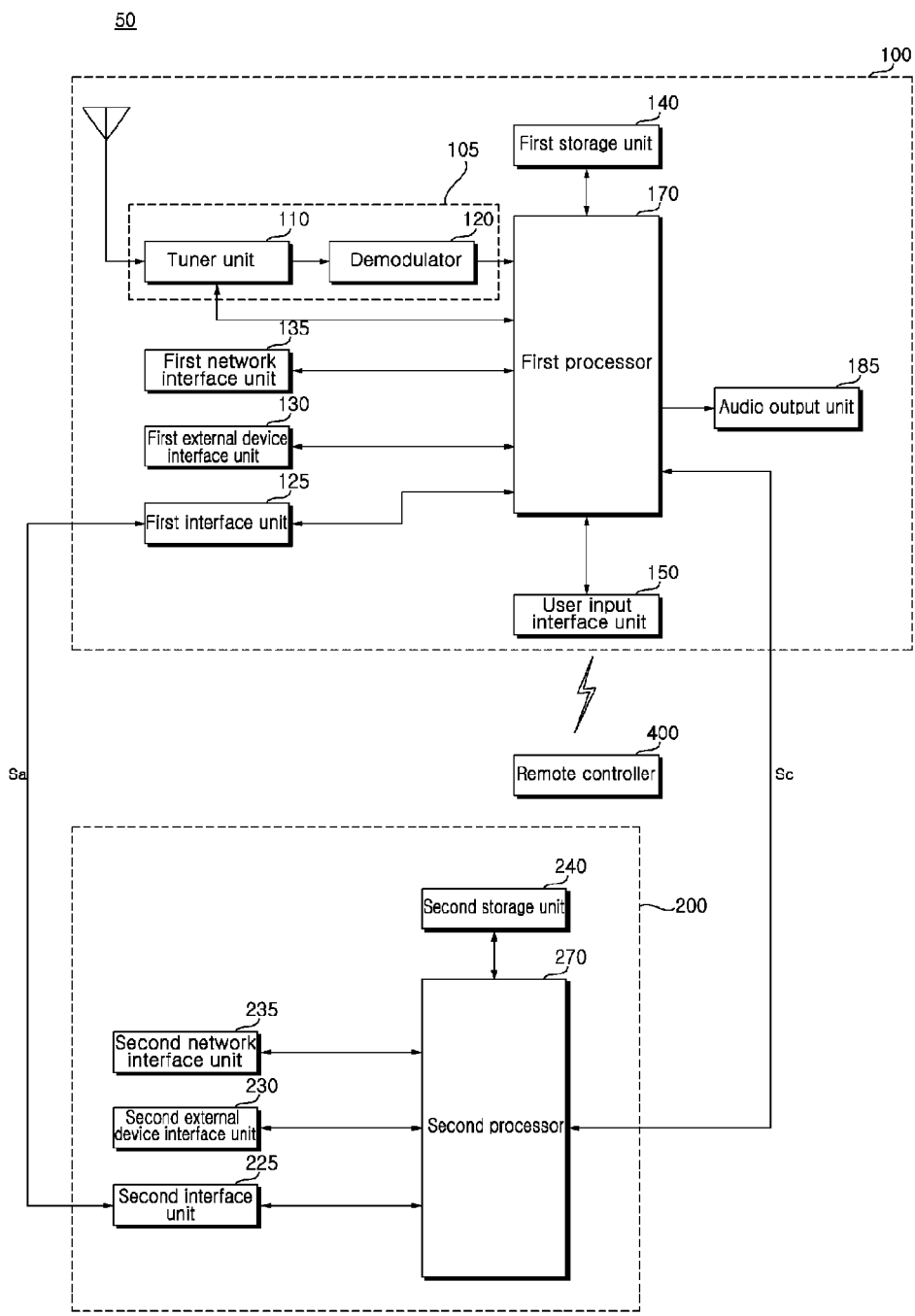
FIG. 4 is an internal block diagram of the video provision apparatus shown in FIG. 3.

FIG. 4 is an internal block diagram of the video provision apparatus shown in FIG. 3.

Referring to FIG. 4, the video provision apparatus 50 may include the first circuit board 100 and the second circuit board 200.

The first circuit board 100 may include a broadcast reception unit 105, a first interface unit 125, a first external device interface unit 130, a first network interface unit 135, a first storage unit 140, a user input interface unit 150, a first processor 170, and an sound output unit 185.

The second circuit board 200 may include a second interface unit 225, a second external device interface unit 230, a second network interface unit 235, a second storage unit 240, and a second processor 270.

The broadcast reception unit 105 may include a tuner unit 110 and a demodulator 120. In the figure, the broadcast reception unit 105 does not include the first network interface unit 135. However, the broadcast reception unit 105 may further include the first network interface unit 135. On the other hand, the broadcast reception unit 105 may be designed to include only the first network interface unit 135 but not to include the tuner unit 110 and the demodulator 120.

The broadcast reception unit 105 may further include the first external device interface unit 130 although the broadcast reception unit 105 does not include the first external device interface unit 130 in the figure. For example, the broadcast reception unit 105 may receive a broadcast signal from an external settop box via the first external device interface unit 130.

The tuner unit 110 tunes to a radio frequency (RF) broadcast signal corresponding to a channel selected by a user or all prestored channels from among RF broadcast signals received by an antenna. In addition, the tuner unit 110 converts the tuned RF broadcast signal into an intermediate frequency (IF) signal or a baseband video or audio signal.

On the other hand, the tuner unit 110 may sequentially tune to RF broadcast signals of all broadcast channels stored through a channel memory function from among RF broadcast signals received by the antenna, and convert the tuned RF broadcast signals into intermediate frequency signals or baseband video or audio signals.

Meanwhile, the tuner unit 110 may include a plurality of tuners to receive broadcast signals of a plurality of channels. Alternatively, the tuner unit 110 may include a single tuner to simultaneously receive broadcast signals of a plurality of channels.

The demodulator 120 may receive a digital IF (DIF) signal converted by the tuner unit 110 and perform demodulation.

After performing the demodulation and channel decoding, the demodulator 120 may output a stream signal (TS). In this case, the stream signal may be a multiplexed video signal, a multiplexed audio signal, or a multiplexed data signal.

The stream signal output from the demodulator 120 may be input to the first processor 170. The first processor 170 may perform demultiplexing, video/audio signal processing, etc. Subsequently, the first processor 170 may output a video to the display 180 and output an audio to the sound output unit 185.

The first interface unit 125 may exchange data with the second interface unit 225 of the second circuit board 200.

In particular, in a case in which there is an input for broadcast storage, the first interface unit 125 may transmit a broadcast signal or broadcast video processed by the first processor 170 to the second interface unit 225.

On the other hand, the first interface unit 125 may receive a broadcast signal or broadcast video reproduced by the second circuit board 200 from the second interface unit 225. Alternatively, the first interface unit 125 may receive a background image from the second interface unit 225.

Meanwhile, the first interface unit 125 may transmit a control signal for controlling the second circuit board 200 to the second interface unit 225.

The first interface unit 125 and the second interface unit 225 may perform high definition multimedia interface communication.

The first external device interface unit 130 may transmit or receive data to or from an external device (not shown) which is connected to the video provision apparatus 50. To this end, the first external device interface unit 130 may include an audio/video (NV) input and output unit (not shown) or a wireless communication unit (not shown).

The first external device interface unit 130 may be connected to an external device, such as a digital versatile disc (DVD) player, a Blu-ray player, a game console, a camera, a camcorder, a computer (laptop computer), or a set-top box, in a wired or wireless fashion. In addition, the first external device interface unit 130 may perform an input operation to or an output operation from the external device.

The NV input and output unit may receive a video signal and an audio signal from the external device. Meanwhile, the wireless communication unit may perform a near field wireless communication with another electronic device.

The first external device interface unit 130 may include a universal serial bus (USB) terminal, a composite video banking sync (CVBS) terminal, a component terminal, an S-video terminal, a digital visual interface (DVI) terminal, an HDMI terminal, an RGB terminal, or a D-DUB terminal.

The first network interface unit 135 may provide an interface for connecting the video provision apparatus 50 to a wired or wireless network, including the Internet. For example, the first network interface unit 135 may receive content or data provided by a content provider or a network operator over a network, such as the Internet.

The first storage unit 140 may store a program to process and control signals in the first processor 170. Alternatively, the first storage unit 140 may store a processed video, audio, or data signal.

In addition, the first storage unit 140 may temporarily store a video, audio, or data signal input to the first external device interface unit 130. Furthermore, the first storage unit 140 may store information regarding a specific broadcast channel using a channel memory function, such as a channel map.

In FIG. 4, the first storage unit 140 is provided separately from the first processor 170. However, the present invention is not limited thereto. For example, the first storage unit 140 may be included in the first processor 170.

The user input interface unit 150 may transfer a signal input by a user to the first processor 170 or transfer a signal from the first processor 170 to the user.

For example, the user input interface unit 150 may transmit/receive a user input signal, such as power on/off, channel selection, or screen setting, to/from a remote controller 400, transfer a user input signal input from a local key (not shown), such as a power key, a channel key, a volume key, or a setting key, to the first processor 170, transfer a user input signal input from a sensor unit (not shown) for sensing a gesture of a user to the first processor 170, or transmit a signal from the first processor 170 to the sensor unit (not shown).

The first processor 170 may demultiplex streams input through the tuner unit 110, the demodulator 120, or the first external device interface unit 130, or process the demultiplexed signals to generate and output a video or audio output signal.

The video signal processed by the first processor 170 may be input to the display 180, which may display a video corresponding to the video signal. In addition, the video signal processed by the first processor 170 may be input to an external output device through the first external device interface unit 130.

The audio signal processed by the first processor 170 may be output to the sound output unit 185 in the form of audible sound. In addition, the audio signal processed by the first processor 170 may be input to the external output device through the first external device interface unit 130.

Meanwhile, the first processor 170 may operate a first operating system (OS) using data related to the first OS stored in the first storage unit 140. In addition, the first processor 170 may execute a first OS-based application.

For example, the first OS-based application may include at least one selected from among an external input related application, a broadcast guide application, a stored broadcast content related application, a Bluetooth application, a reservation application, a digital video recorder (DVR) application, a hotkey application, an Internet telephony service application based on network access, a video on demand (VOD) service application, a web album service application, a social networking service (SNS) application, a location-based service (LBS) application, a map application, a web browsing application, a game application, and a schedule management application.

Meanwhile, the first OS may be a Unix (or Linux)-based OS or a web-based OS.

Although not shown in FIG. 4, the first processor 170 may include a demultiplexing unit and a video processing unit, which will hereinafter be described with reference to FIG. 5.

On the other hand, the first processor 170 may control overall operation of the video provision apparatus 50. In particular, the first processor 170 may control overall operation of the respective units constituting the first circuit board 100 of the video provision apparatus 50.

For example, the first processor 170 may control the tuner unit 110 tune to an RF broadcast corresponding to a channel selected by a user or a prestored channel.

In addition, the first processor 170 may control the video provision apparatus 50 based on a user command input through the user input interface unit 150 or an internal program.

On the other hand, the first processor 170 may control the display 180 to display a video. In this case, the video displayed on the display 180 may be a still picture or a motion picture. On the other hand, the video displayed on the display 180 may be a two-dimensional (2D) video or a three-dimensional (3D) video.

Meanwhile, the first processor 170 may recognize location of a user based on a video of the user taken by the camera 195. For example, the first processor 170 may recognize a distance (z-axis coordinate) between the user and the video provision apparatus 50. In addition, the first processor 170 may recognize an x-axis coordinate and a y-axis coordinate in the display 180 corresponding to the location of the user.

Although not shown in the figure, a channel browsing processor for generating a thumbnail image corresponding to a channel signal or an external input signal may be further provided. The channel browsing processor may receive a stream signal (TS) output from the demodulator 120 or a stream signal output from the first external device interface unit 130, and extract an image from the received stream signal to generate a thumbnail image. The generated thumbnail image may be stream-decoded together with the decoded video and then input to the first processor 170. The first processor 170 may control a thumbnail list including a plurality of thumbnail images to be displayed on the display 180 using the input thumbnail image.

The sound output unit 185 may receive an audio signal processed by the first processor 170 and output the received audio signal in the form of audible sound.

A power supply unit (not shown) may supply power to the video provision apparatus 50. In particular, the power supply unit may supply power to the first processor 170, which may be embodied in the form of a system on chip (SOC), and the display 180 for displaying a video, and the sound output unit 185 for outputting an audio.

Specifically, the power supply unit (not shown) may include AC/DC converter for converting AC power into DC power and a DC/DC converter for converting a level of the DC power.

The remote controller 400 may transmit a user input to the user input interface unit 150. To this end, the remote controller 400 may use Bluetooth communication, radio frequency (RF) communication, infrared (IR) communication, ultra wideband (UWB) communication, or ZigBee communication. In addition, the remote controller 400 may receive a video, audio, or data signal output from the user input interface unit 150 such that the remote controller 400 displays the received signal or outputs the received signal in the form of audible sound.

Meanwhile, the video provision apparatus 50 may be a fixed or mobile digital broadcast receiver that is capable of receiving a digital broadcast.

The second interface unit 225 of the second circuit board 200 may exchange data with the first interface unit 125 of the first circuit board 100.

In particular, in a case in which there is an input for broadcast storage, the second interface unit 225 may receive a processed broadcast signal or broadcast video from the first interface unit 125 of the first circuit board 100.

On the other hand, in a case in which there is an input for broadcast reproduction, the second interface unit 225 may transmit a broadcast signal or broadcast video processed by the second processor 270 to the first interface unit 125 of the first circuit board 100.

Meanwhile, the second interface unit 225 may transmit a background image for a home screen to the first interface unit 125 of the first circuit board 100.

In addition, the second interface unit 225 may receive a control signal for controlling the second circuit board 200 from the first interface unit 125 of the first circuit board 100.

The second external device interface unit 230 may transmit or receive data to or from an external device (not shown) which is connected to the video provision apparatus 50. To this end, the second external device interface unit 230 may include an audio/video (A/V) input and output unit (not shown) or a wireless communication unit (not shown).

The second external device interface unit 230 may be connected to an external device, such as a DVD player, a Blu-ray player, a game console, a camera, a camcorder, a computer (laptop computer), or a set-top box, in a wired or wireless fashion. In addition, the first external device interface unit 130 may perform an input operation to or an output operation from the external device.

The second external device interface unit 230 may include a USB terminal, a CVBS terminal, a component terminal, an S-video terminal, a DVI terminal, an HDMI terminal, an RGB terminal, or a D-DUB terminal.

The second network interface unit 235 may provide an interface for connecting the video provision apparatus 50 to a wired or wireless network, including the Internet. For example, the second network interface unit 235 may receive content or data provided by a content provider or a network operator over a network, such as the Internet.

Meanwhile, the first interface unit 235a, the second interface unit, and the third interface unit 235c of the personal server 50 as described above may be included in the second network interface unit 235.

The second storage unit 240 may store a program to process and control signals in the second processor 270. Alternatively, the second storage unit 240 may store a processed video, audio, or data signal.

In addition, the second storage unit 240 may temporarily store a video, audio, or data signal input to the second external device interface unit 230.

The second processor 270 may process signals input through the second external device interface unit 230 to generate and output a video or audio output signal.

Meanwhile, the second processor 270 may execute high performance functions, such as video capture using the camera, gesture recognition, web access, and game execution. In addition, the second processor 270 may provide a screen for each function to the first circuit board 100.

The audio signal processed by the second processor 270 may be transmitted to the first circuit board 100 via the second interface unit 225 such that the audio signal is output from the sound output unit 285 of the first circuit board 100 in the form of audible sound.

In addition, the second processor 270 may control overall operation of the video provision apparatus 50. In particular, the second processor 270 may control overall operation of the respective units of the second circuit board 200.

Meanwhile, the second processor 270 may recognize location of a user based on a video of the user taken by the camera 195. For example, the second processor 270 may recognize a distance (z-axis coordinate) between the user and the video provision apparatus 50. In addition, the second processor 270 may recognize an x-axis coordinate and a y-axis coordinate in the display 180 corresponding to the location of the user.

Meanwhile, the second processor 270 may operate a second operating system (OS) using data related to the second OS stored in the second storage unit 240. In addition, the second processor 270 may execute a second OS-based application.

The second OS may be different from the first OS. For example, the second OS may be a Windows-based OS, a Mac-based OS, a Unix-based OS, etc.

For example, the second OS-based application may include at least one selected from among a news related application, a social networking service related application, a mail related application, a document editing related application, a video reproduction related application, an audio reproduction related application, a web browser application, a game application, a map application, and a schedule management application.

Meanwhile, the block diagram of the video provision apparatus 50 shown in FIG. 4 is a view illustrating the embodiment of the present invention. The respective components of the block diagram may be combined, added, or omitted according to the specifications of the video provision apparatus 50 which is actually embodied. That is, two or more components may be combined into a single component or one component may be divided into two or more components as needed. In addition, the function performed by each block is intended for description of the embodiment of the invention, and its detailed action or device does not limit the scope of the invention.

Figure 5:
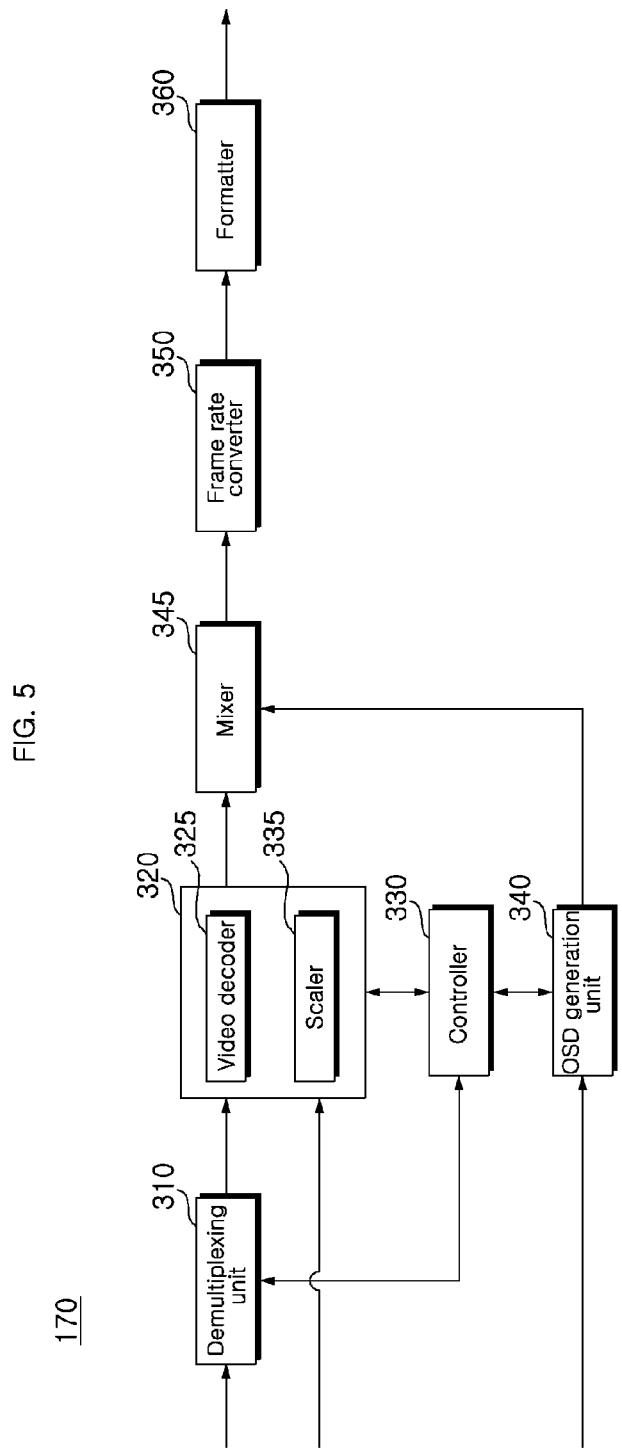
FIG. 5 is an internal block diagram of a first processor shown in FIG. 4.

FIG. 5 is an internal block diagram of the first processor shown in FIG. 4.

Referring to FIG. 5, the first processor 170 according to the embodiment of the present invention may include a demultiplexing unit 310, a video processing unit 320, a controller 330, an on-screen display (OSD) generation unit 340, a mixer 345, a frame rate converter 350, and a formatter 360. In addition, the first processor 170 may further include an audio processing unit (not shown) and a data processing unit (not shown).

The demultiplexing unit 310 may demultiplex an input stream. For example, in a case in which an MPEG-2 TS is input, the demultiplexing unit 310 may demultiplex the MPEG-2 TS into video, audio, and data signals. The stream signal input to the demultiplexing unit 310 may be a stream signal output from the tuner unit 110, the demodulator 120, or the first external device interface unit 130.

The video processing unit 320 may process a demultiplexed video signal. To this end, the video processing unit 320 may include a video decoder 325 and a scaler 335.

The video decoder 325 may decode the demultiplexed video signal, and the scaler 335 may scale the resolution of the decoded video signal such that the video signal can be output to the display 180.

Decoders based on various standards may be used as the video decoder 325.

The controller 330 may control overall operation of the video provision apparatus 50 or the first processor 170. For example, the controller 330 may control the tuner unit 110 to tune to an RF broadcast corresponding to a channel selected by a user or a prestored channel.

In addition, the controller 330 may control the video provision apparatus 50 based on a user command input through the user input interface unit 150 or an internal program.

Furthermore, the controller 330 may control data transmission to the first network interface unit 135 or the first external device interface unit 130.

In addition, the controller 330 may control operations of the demultiplexing unit 310, the video processing unit 320, and the OSD generation unit 340 of the first processor 170.

The OSD generation unit 340 may generate an OSD signal according to a user input or autonomously. For example, the OSD generation unit 340 may generate a signal to display various kinds of information on the screen of the display 180 in the form of graphics or text based on a user input signal. The generated OSD signal may include various data, such as a user interface screen, various menu screens, a widget, and an icon, of the video provision apparatus 50.

In addition, the OSD generation unit 340 may generate a pointer that can be displayed on the display 180 based on a pointing signal input from the remote controller 400. In particular, the pointer may be generated by a pointing signal processing unit. The OSD generation unit 340 may include such a pointing signal processing unit (not shown). Of course, the pointing signal processing unit (not shown) may not be provided in the OSD generation unit 340 but may be separately provided.

The mixer 345 may mix the OSD signal generated by the OSD generation unit 340 with the decoded video signal processed by the video processing unit 320. At this time, the OSD signal and the decoded video signal may each include at least one selected from between a 2D signal and a 3D signal. The mixed video signal may be provided to the frame rate converter 350.

The frame rate converter (FRC) 350 may convert the frame rate of an input video. On the other hand, the frame rate converter 350 may directly output an input video without conversion of the frame rate of the input video.

The formatter 360 may change the format of the input video signal into a specific format.

For example, the formatter 360 may arrange left-eye video frames and right-eye video frames of a 3D video, the frame rate of which has been converted, for 3D display. In addition, the formatter 360 may output a synchronizing signal Vsync for opening a left-eye glass and a right-eye glass of a 3D watching apparatus (not shown).

Meanwhile, the formatter 360 may change the format of a 3D video signal. For example, the formatter 360 may change the format of the 3D video signal into any one of the above-mentioned formats.

On the other hand, the formatter 360 may convert a 2D video signal into a 3D video signal. For example, the formatter 360 may detect an edge or a selectable object from a 2D video signal, and separate an object based on the detected edge or the selectable object from the 2D video signal to generate a 3D video signal according to a 3D video generation algorithm. As described above, the generated 3D video signal may be divided into a left-eye video signal L and a right-eye video signal R, which may be arranged.

Meanwhile, the audio processing unit (not shown) of the first processor 170 may process a demultiplexed audio signal. To this end, the audio processing unit (not shown) may include various decoders.

In addition, the audio processing unit (not shown) of the first processor 170 may adjust bass, treble, and volume of the audio signal.

The data processing unit (not shown) of the first processor 170 may process a demultiplexed data signal. For example, in a case in which the demultiplexed data signal is an encoded data signal, the data processing unit may decode the demultiplexed data signal. The encoded data signal may be electronic program guide (EPG) information containing broadcast information, such as start time and end time, of a broadcast program provided by each channel.

Meanwhile, the block diagram of the first processor 170 shown in FIG. 5 is a view illustrating the embodiment of the present invention. The respective components of the block diagram may be combined, added, or omitted according to the specifications of the first processor 170 which is actually embodied.

In particular, the frame rate converter 350 and the formatter 360 may not be provided in the first processor 170 but may be separately provided.

Figure 6A:
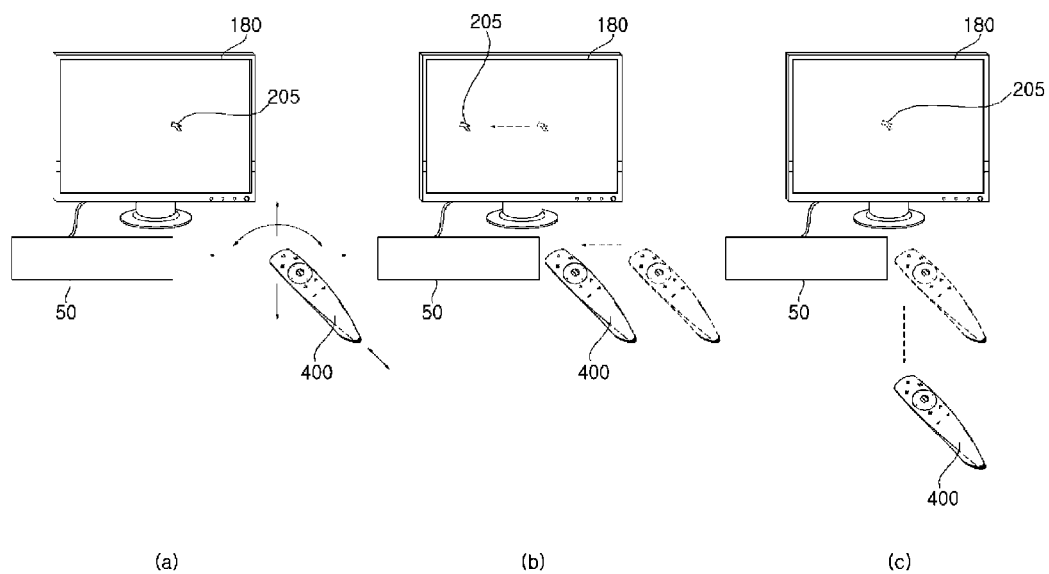
FIG. 6A is a view showing a control method of a remote controller shown in FIG. 4.

FIG. 6A is a view showing a control method of a remote controller shown in FIG. 4.

As shown in FIG. 6A(a), a pointer 205 corresponding to the remote controller 400 is displayed on the display 180.

A user may move or rotate the remote controller 400 up and down, side to side (FIG. 6A(b)), or back and forth (FIG. 6A(c)). The pointer 205 displayed on the display 180 corresponds to motion of the remote controller 400. Since the pointer 205 corresponding to the remote controller 400 is moved and displayed according to motion of the remote controller 400 in a 3D space as shown in the figures, the remote controller 400 may be named a spatial remote controller or a 3D pointing device.

FIG. 6A(b) illustrates that, when the user moves the remote controller 400 to the left, the pointer 205 moves to the left on the display 180 in response to the movement of the remote controller 400.

Information regarding motion of the remote controller 400 sensed by a sensor of the remote controller 400 is transmitted to the video provision apparatus 50. The video provision apparatus 50 may calculate the coordinates of the pointer 205 from the motion information of the remote controller 400. The video provision apparatus 50 may provide the pointer 205 based on the calculated coordinates. Consequently, the pointer 205 may be displayed on the display 180.

FIG. 6A(c) illustrates that the user moves the remote controller 400 away from the display 180 while pressing a specific button of the remote controller 400. As a result, a selected area in the display 180 corresponding to the pointer

205 may be zoomed in and thus enlarged on the display 180. When the user moves the remote controller 400 toward the display 180, on the other hand, a selected area in the display 180 corresponding to the pointer 205 may be zoomed out and thus contracted on the display 180. Alternatively, the selected area may be zoomed out when the remote controller 400 moves away from the display 180, and the selected area may be zoomed in when the remote controller 400 moves toward the display 180.

Meanwhile, the up, down, left, and right movements of the remote controller 400 may not be recognized in a state in which a specific button of the remote controller 400 is pressed. That is, when the remote controller 400 moves away from or toward the display 180, the up, down, left, and right movements of the remote controller 400 may not be recognized but only the back and forth movement of the remote controller 400 may be recognized. In a state in which a specific button of the remote controller 400 is not pressed, only the pointer 205 moves in accordance with the up, down, left or right movement of the remote controller 400.

Meanwhile, the movement speed or direction of the pointer 205 may correspond to the movement speed or direction of the remote controller 400.

The user input interface unit 150 may receive a pointing signal from the remote controller 400, and the first processor 170 may provide the pointer 205 based on the received pointing signal as shown in FIGS. 6A(a) to 6A(c).

Figure 6B:
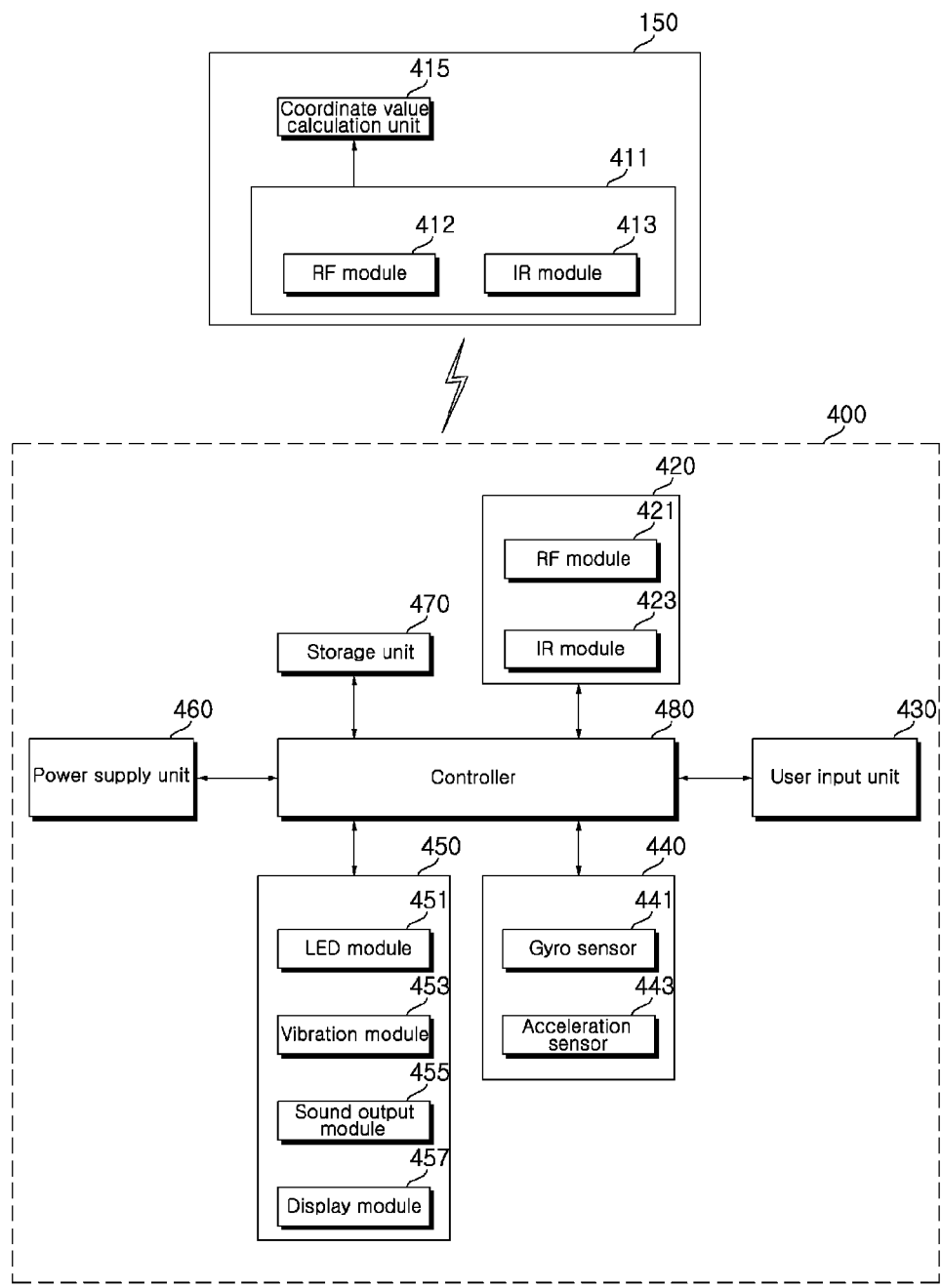
FIG. 6B is an internal block diagram of the remote controller shown in FIG. 4.

FIG. 6B is an internal block diagram of the remote controller shown in FIG. 4.

Referring to FIG. 6B, the remote controller 400 may include a wireless communication unit 420, a user input unit 430, a sensor unit 440, an output unit 450, a power supply unit 460, a storage unit 470, and a controller 480.

The wireless communication unit 420 may transmit and receive signals to and from the video provision apparatus 50 according to the embodiment of the present invention as described above.

For example, the wireless communication unit 420 may include an RF module 421 to transmit and receive signals to and from the video provision apparatus 50 according to an RF communication standard. In addition, the wireless communication unit 420 may further include an IR module 423 to transmit and receive signals to and from the video provision apparatus 50 according to an IR communication standard.

The remote controller 400 may transmit a signal containing information regarding motion of the remote controller 400 to the video provision apparatus 50 through the RF module 421.

In addition, the remote controller 400 may receive a signal from the video provision apparatus 50 through the RF module 421. As needed, the remote controller 400 may transmit a command, such as a power on/off command, a channel switch command, or a volume change command, to the video provision apparatus 50 through the IR module 423.

The user input unit 430 may include a keypad, a button, a touchpad, or a touchscreen. The user may input a command related to the video provision apparatus 50 to the remote controller 400 by manipulating the user input unit 430. In a case in which the user input unit 430 includes a hard key button, the user may input a command related to the video provision apparatus 50 to the remote controller 400 by pushing the hard key button. On the other hand, in a case in which the user input unit 430 includes a touchscreen, the user may input a command related to the video provision apparatus 50 to the remote controller 400 by touching a soft key of the touchscreen. In addition, the user input unit 430 may include various input tools, such as a scroll key and a jog wheel, which do not limit the scope of the present invention.

The sensor unit 440 may include a gyro sensor 441 or an acceleration sensor 443. The gyro sensor 441 may sense motion of the remote controller 400.

For example, the gyro sensor 441 may sense the motion of the remote controller 400 in x, y, and z-axis directions. The acceleration sensor 443 may sense the movement speed of the remote controller 400. The sensor unit 440 may further include a distance sensor for sensing the distance between the remote controller 400 and the video provision apparatus 50 or the display 180.

The output unit 450 may output a video or audio signal corresponding to manipulation of the user input unit 430 or corresponding to a signal received from the video provision apparatus 50. The user may recognize whether the user input unit 430 has been manipulated or whether the video provision apparatus 50 has been controlled, through the output unit 450.

For example, the output unit 450 may include a light emitting diode (LED) module 451 configured to be turned on when the user input unit 430 is manipulated or when a signal is received from or transmitted to the video provision apparatus 50 through the wireless communication module 420, a vibration module 453 for generating vibration, a sound output module 455 for outputting sound, or a display module 457 for outputting a video.

The power supply unit 460 supplies power to the remote controller 400. In a case in which the remote controller 400 remains stationary for a predetermined time, the power supply unit 460 may interrupt the supply of power to the remote controller 400 to reduce power consumption. The power supply unit 460 may resume the supply of power to the remote controller 400 when a predetermined key of the remote controller 400 is manipulated.

The storage unit 470 may store various types of programs and application data necessary to control or drive the remote controller 400. The remote controller 400 may wirelessly transmit and receive signals to and from the video provision apparatus 50 over a predetermined frequency band through the RF module 421. The controller 480 of the remote controller 400 may store in the memory 470 information regarding a frequency band to wirelessly transmit and receive signals to and from the video provision apparatus 50 paired with the remote controller 400 and refer to the stored information.

The controller 480 may control overall operation of the remote controller 400. The controller 480 may transmit a signal corresponding to manipulation of a predetermined key of the user input unit 430 or a signal corresponding to motion of the remote controller 400 sensed by the sensor unit 440 to the video provision apparatus 50 through the wireless communication unit 420.

The user input interface unit 150 of the video provision apparatus 50 may include a wireless communication unit 411 for wirelessly transmitting and receiving signals to and from the remote controller 400 and a coordinate value calculation unit 415 for calculating a coordinate value of a pointer corresponding to motion of the remote controller 400.

The user input interface unit 150 may wirelessly transmit and receive signals to and from the remote controller 400 through an RF module 412. In addition, the user input interface unit 150 may receive a signal from the remote controller 400 according to an IR communication standard through an IR module 413.

The coordinate value calculation unit 415 may correct a hand tremor or an error from a signal corresponding to motion of the remote controller 400 received through the wireless communication unit 411 to calculate a coordinate value (x, y) of the pointer 205 to be displayed on the display 180.

A signal from the remote controller 400, which is input to the video provision apparatus 50 through the user input interface unit 150, is transmitted to the processor 270 of the video provision apparatus 50. The processor 270 may differentiate information regarding motion and key manipulation of the remote controller 400 from the signal received from the remote controller 400, and control the video provision apparatus 50 in response thereto.

In another example, the remote controller 400 may calculate a coordinate value of the pointer corresponding to motion thereof, and output the calculated coordinate value to the user input interface unit 150 of the video provision apparatus 50. In this case, the user input interface unit 150 of the video provision apparatus 50 may transmit information regarding the received coordinate value of the pointer to the processor 270 without correcting a hand tremor or an error.

In a further example, the coordinate value calculation unit 415 may be provided in the first processor 170, not in the user input interface unit 150, unlike in the figure.

Figure 7:
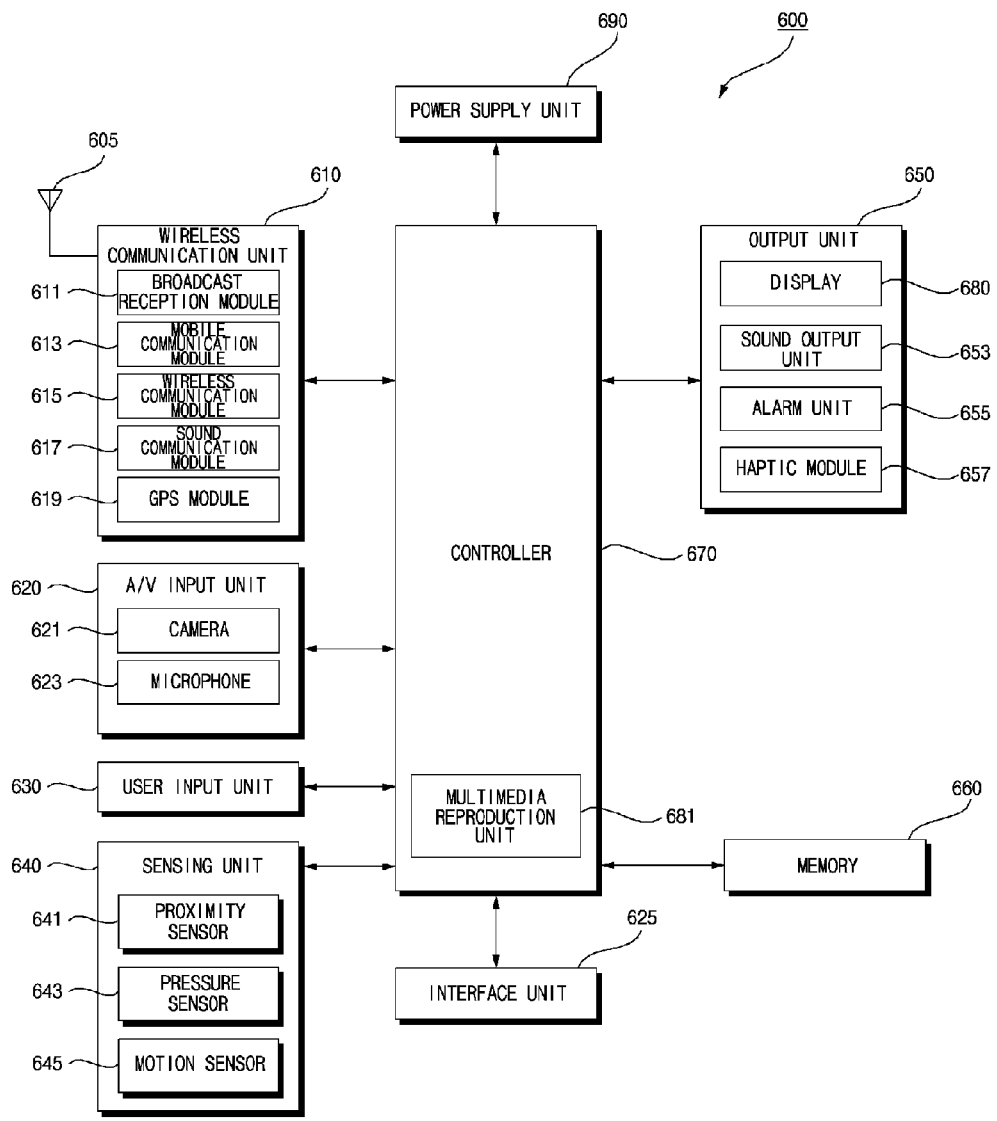
FIG. 7 is an internal block diagram of a terminal shown in FIG. 3.

FIG. 7 is an internal block diagram of the terminal shown in FIG. 3.

Referring to FIG. 7, the terminal 600 may include a mobile terminal.

The mobile terminal 600 may include a wireless communication unit 610, an audio/video (A/V) input unit 620, a user input unit 630, a sensing unit 640, an output unit 650, a memory 660, an interface unit 625, a controller 670, and a power supply unit 690.

The wireless communication unit 610 may include a broadcast reception module 611, a mobile communication module 613, a wireless communication module 615, a sound communication module 617, and a global positioning system (GPS) module 619.

The broadcast reception module 611 may receive a broadcast signal and/or broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits and receives a wireless signal to and from at least one selected from among a base station, an external terminal, and a server over a mobile communication network. The wireless signal may include a voice call signal, a video communication call signal, or various types of data based on text/multimedia message transmission and reception.

The wireless communication module 615 is a module for wireless Internet access. The wireless communication module 615 may be mounted inside or outside the mobile terminal 600. For example, the wireless communication module 615 may perform wireless communication based on Wi-Fi or wireless communication based on Wi-Fi Direct.

The sound communication module 617 may perform sound communication. In a sound communication mode, the sound communication module 617 may add predetermined information data to audio data to be output in order to output sound. In addition, the sound communication module 617 may extract predetermined information data from an external sound in the sound communication mode.

Bluetooth, radio frequency identification (RFID), infrared data association (IrDA), ultra wideband (UWB), or ZigBee may be used as short range communication technology.

The GPS module 619 may receive position information from a plurality of artificial GPS satellites.

The A/V input unit 620 is provided to allow an audio signal or video signal input. The A/V input unit 620 may include a camera 621 and a microphone 623.

The user input unit 630 generates key input data input by a user to control the operation of the terminal. To this end, the user input unit 630 may include a keypad, a dome switch, and a touchpad (static pressure or electrostatic). Particularly, in a case in which the touchpad forms a layered structure together with a display 680, an assembly of the touchpad and the display 680 may be called a touchscreen.

The sensing unit 640 may sense a current state of the mobile terminal 600, such as an open or closed state of the mobile terminal 600, the position of the mobile terminal 600, and whether user contact with the mobile terminal 600 has occurred, to generate a sensing signal to control the operation of the mobile terminal 600.

The sensing unit 640 may include a proximity sensor 641, a pressure sensor 643, and a motion sensor 645. The motion sensor 645 may sense the motion or position of the mobile terminal 600 using an acceleration sensor, a gyro sensor, a gravity sensor, etc. In particular, the gyro sensor is a sensor for measuring angular velocity of the mobile terminal 600. The gyro sensor may sense a direction (angle) of the mobile terminal 600 rotated from a reference direction.

The output unit 650 may include a display 680, an sound output unit 653, an alarm unit 655, and a haptic module 657.

The display 680 outputs, i.e. displays, information processed by the mobile terminal 600.

Meanwhile, in a case in which the display 680 and the touchpad are disposed as a layered structure to form a touchscreen as described above, the display 680 may also be used as an input device that allows a user to input information by touch in addition to an output device.

The sound output unit 653 outputs audio data received from the wireless communication unit 610 or stored in the memory 660. The sound output unit 653 may include a speaker and a buzzer.

The alarm unit 655 outputs a signal to inform about generation of an event of the mobile terminal 600. For example, the alarm unit 655 may output a signal in the form of vibration.

The haptic module 657 generates a variety of tactile effects that a user may feel. A typical example of the tactile effects generated by the haptic module 657 is a vibration effect.

The memory 660 may store a program for processing or control of the controller 670 or temporarily store input or output data (e.g. phonebooks, messages, still pictures, and motion pictures).

The interface unit 625 interfaces between the mobile terminal 600 and all external devices connected to the mobile terminal 600. The interface unit 625 may receive data or power from the external devices and transfer the received data or power to the respective components of the mobile terminal 600. In addition, data may be transmitted from the mobile terminal 600 to the external devices via the interface unit 625.

The controller 670 controls operations of the respective components of the mobile terminal 600, thereby controlling overall operation of the mobile terminal 600. For example, the controller 670 may perform control or processing for voice communication, data communication, and video communication. In addition, the controller 670 may further include a multimedia reproduction unit 681 for reproducing multimedia content. The multimedia reproduction unit 681 may be incorporated into the controller 670 in the form of hardware. Alternatively, the multimedia reproduction unit 681 may be configured in the form of software separately from the controller 670.

The power supply unit 690 supplies external power or internal power to the respective components of the mobile terminal 600 under control of the controller 670.

Meanwhile, the block diagram of the mobile terminal 600 shown in FIG. 7 is a view illustrating the embodiment of the present invention. The respective components of the block diagram may be combined, added, or omitted according to the specifications of the mobile terminal 600 which is actually embodied. That is, two or more components may be combined into a single component or one component may be divided into two or more components as needed. In addition, the function performed by each block is intended for description of the embodiment of the invention, and its detailed action or device does not limit the scope of the invention.

FIGS. 8A to 14B are reference views illustrating the operation of the home device remote control system of FIG. 1.

Figure 8A:
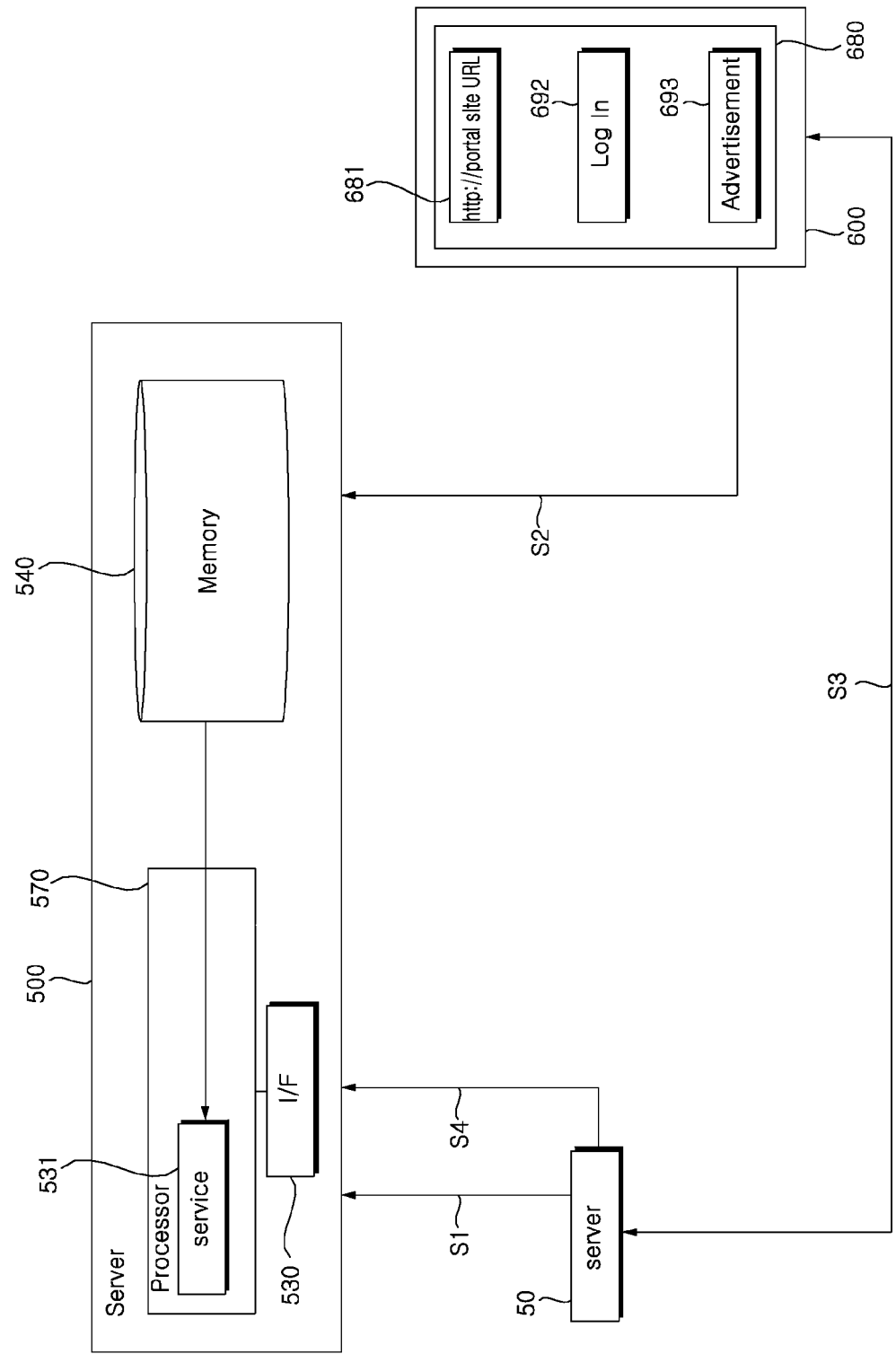

FIG. 8A is a view illustrating registration of the personal server and the terminal's access to the personal server.

First, the personal server 50 transmits a first signal S1 for product registration to the home device access server 500. The first signal S1 may include device information and network information of the personal server 50. In addition, the first signal S1 may further include home device list information which may be managed by the personal server 50. The home device list information may include product information and network information of at least one home device.

The home device access server 500 may store the received device information and network information in the memory 540, and perform product registration.

Subsequently, when a web address of the home device access server 500 is input to an input window 681 (see FIG. 10A) in a state in which a web browser is executed in the terminal 600, the terminal 600 transmits a second signal S2 to the home device access server 500. The second signal S2 may include an access request signal.

The home device access server 500 may transmit information for accessing the personal server or a screen for accessing the personal server to the terminal 600 in response to the access request signal.

On the other hand, when login information is input in a state in which the terminal 600 has accessed the home device access server 500, the terminal 600 transmits a second signal S2 to the home device access server 500. At this time, the second signal S2 may include login information.

The home device access server 500 may transmit personal server list information or a personal server list screen to the terminal 600 in response to the login information.

When a specific personal server item is selected from the personal server list displayed after the terminal 600 has accessed the home device access server 500, the terminal 600 transmits a second signal S2 to the home device access server 500. At this time, the second signal S2 may include an information request for the selected personal server.

The home device access server 500 may transmit network information, including public ID information and private IP information, of the selected personal server to the terminal 600 in response to the information request for the personal server. In addition, the home device access server 500 may further transmit device information and account ID information of the personal server to the terminal 600.

The terminal 600 may access the personal server 50 using the received network information. To this end, the terminal 600 may transmit a third signal S3 to the personal server 50 using the received network information. The third signal S3 may include an access request signal.

The personal server 50 may transmit home device list information stored therein to the terminal 600 in response to the access request signal. In a case in which any one home device is selected from the home device list, the personal server 50 may transmit product information and network information of the selected home device to the terminal 600.

The terminal 600 may receive home device list information from the accessed personal server 50 and display a home device list screen. In a case in which a user selects any one home device item from the home device list, the terminal 600 may request product information and network information of the selected home device from the accessed personal server 50 to receive the product information and the network information of the selected home device.

As a result, the user of the terminal 600 may easily and conveniently remotely control the home devices which can be managed by the personal server 50 after access to the personal server 50. Consequently, user convenience may be improved.

Meanwhile, the personal server 50 may periodically transmit the device information and the network information of the personal server 50 to the home device access server 500 such that the device information and the network information of the personal server 50 can be updated by the home device access server 500. To this end, the personal server 50 may transmit a fourth signal S4 including updated network information to the home device access server 500. The fourth signal S4 may further include home device list information containing information regarding any newly added home device.

Figure 8C:
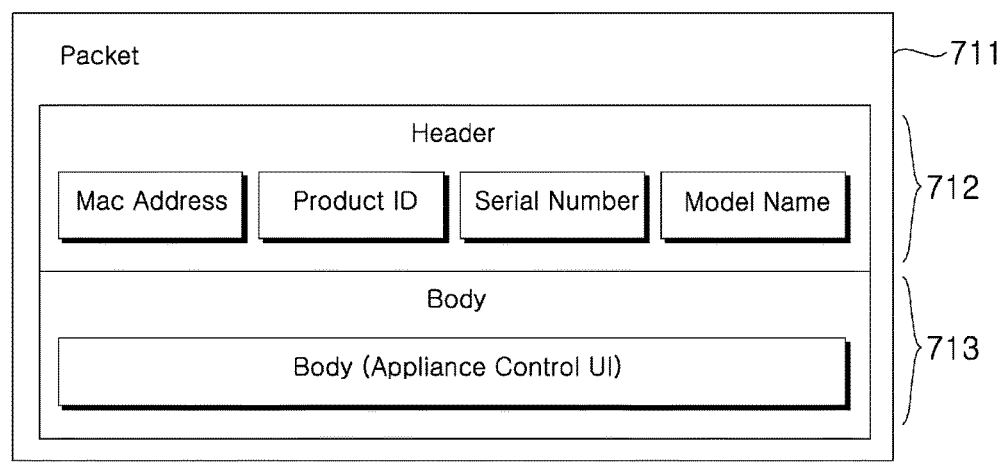

FIGS. 8B to 8D are reference views given to describe FIG. 8A in more detail.

First, FIG. 8B illustrates home device items, such as a refrigerator 60a, a washer 60b, an air conditioner 60c, and a TV 60f, which can be managed by the personal server 50.

The personal server 50 receives signals S1a including product information and network information from the respective home devices 60a, 60b, 60c, and 60f.

As shown in FIG. 8C, each signal S1a may be received in the form of a data packet 711 including a header 712 and a body 713.

The header 712 may include MAC address information, which is the network information of each home device, and product ID information, serial number information, and model name information, which are the product information of each home device.

The personal server 50 may store a home device list including the refrigerator 60a, the washer 60b, the air conditioner 60c, and the TV 60f as the home device items which can be managed by the personal server 50 in the storage unit 240 based on the received signals S1a.

In particular, as shown in FIG. 8D, a home device list 716 may be stored in the storage unit 240.

The home device list 716 of FIG. 8D may include MAC address information, product ID information, product name information, serial number information, and model name information per home device.

The personal server 50 may transmit a signal S1 including the home device list information to the home device access server 500 together with the device information and the network information of the personal server 50.

Subsequently, when a web address of the home device access server 500 is input to an input window 681 in a state in which a web browser is executed in the terminal 600, the terminal 600 transmits a second signal S2 to the home device access server 500. The second signal S2 may include an access request signal.

The home device access server 500 may transmit information for accessing the personal server or a screen for accessing the personal server to the terminal 600 in response to the access request signal.

On the other hand, when login information is input the terminal 600 transmits a second signal S2 to the home device access server 500. At this time, the second signal S2 may include login information.

The home device access server 500 may transmit personal server list information or a personal server list screen to the terminal 600 in response to the login information.

When a specific personal server item is selected from the personal server list displayed after the terminal 600 has accessed the home device access server 500, the terminal 600 transmits a second signal S2 to the home device access server 500. At this time, the second signal S2 may include an information request for the selected personal server.

The home device access server 500 may transmit network information, including public ID information and private IP information, of the selected personal server to the terminal 600 in response to the information request for the personal server. In addition, the home device access server 500 may further transmit device information and account ID information of the personal server to the terminal 600.

The terminal 600 may access the personal server 50 using the received network information. To this end, the terminal 600 may transmit a third signal S3 to the personal server 50 using the received network information. The third signal S3 may include an access request signal.

The personal server 50 may transmit home device list information stored therein to the terminal 600 in response to the access request signal. In a case in which any one home device is selected from the home device list, the personal server 50 may transmit the product information and the network information of the selected home device to the terminal 600.

The terminal 600 may receive home device list information from the accessed personal server 50 and display a home device list screen. In a case in which the user selects any one home device item from the home device list, the terminal 600 may request the product information and the network information of the selected home device from the accessed personal server 50 to receive the product information and the network information of the selected home device.

As a result, the user of the terminal 600 may easily and conveniently remotely control the home devices which can be managed by the personal server 50 after access to the personal server 50. Consequently, user convenience may be improved.

Meanwhile, the personal server 50 may periodically transmit the device information and the network information of the personal server 50 to the home device access server 500 such that the device information and the network information of the personal server 50 can be updated by the home device access server 500.

On the other hand, the personal server 50 may receive a signal S4a including information regarding a newly added home device. FIG. 8B illustrates that product information and network information of a robot cleaner 60e, which is a newly added home device, are transmitted while being included in the signal S4. The signal S4 may be transmitted in the form of the data packet 711 as shown in FIG. 8C.

The personal server 50 may update the home device list information using the information regarding the newly added home device.

In addition, the personal server 50 may transmit a fourth signal S4 including the home device list information to the home device access server 500 such that the home device list information can be updated by the home device access server 500.

FIG. 9 is a view illustrating a route along which a remote control command input through the terminal is transmitted to a home device.

First, in a case in which a remote control command is input to the terminal 600, the terminal 600 transmits the remote control command to the personal server 50 (S101). The remote control command may include command information and home device information corresponding to the command information.

Subsequently, the first interface unit 235a of the personal server 50 receives the remote control command and transmits the received remote control command to the command parser 277a (S102).

Subsequently, the command parser 277a parses the remote control command and transmits the parsed remote control command to the device manager 277b (S103).

Subsequently, the device manager 277b processes the parsed remote control command and transmits the processed remote control command to the command transmitter 277c (S104).

Subsequently, the command transmitter 277c transmits the received remote control command to the third interface unit 235c. As a result, the remote control command is transmitted to the home device.

Figure 10A:
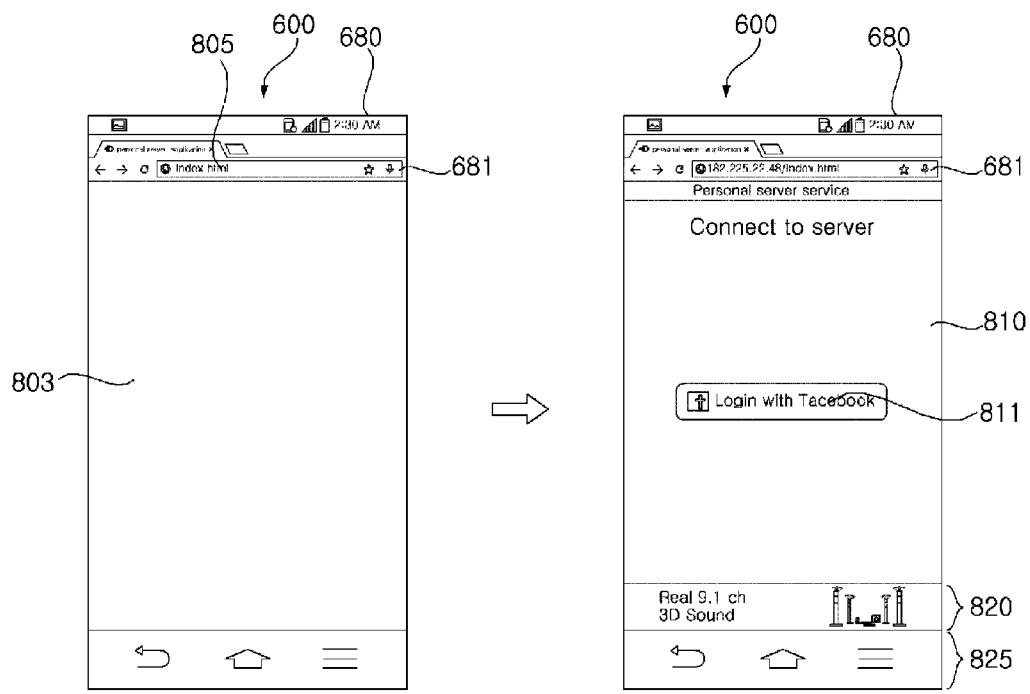

FIG. 10A is a view illustrating that a web browser is executed in the terminal 600, and a web browser screen 803 including a web address input window 805 is displayed on the display 680.

When a web address of "182.255.22.48/index.html" is input to the web address input window 805, a server access screen 810 provided by the home device access server 500 may be displayed on the display 680.

The server access screen 810, which is a screen for providing a personal server service, may include a login object 811 for login.

On the other hand, the terminal 600 may further receive advertisement information from the home device access server 500 in addition to the information related to server access. In this case, an advertisement screen 820 may be displayed together with the server access screen 810. When a specific advertisement item is selected on the advertisement screen 820, an advertisement web page may be displayed.

Meanwhile, a soft key zone 825 for a previous item, a home screen, and a specific menu may be disposed at the lowermost end of the display 680.

Figure 10B:
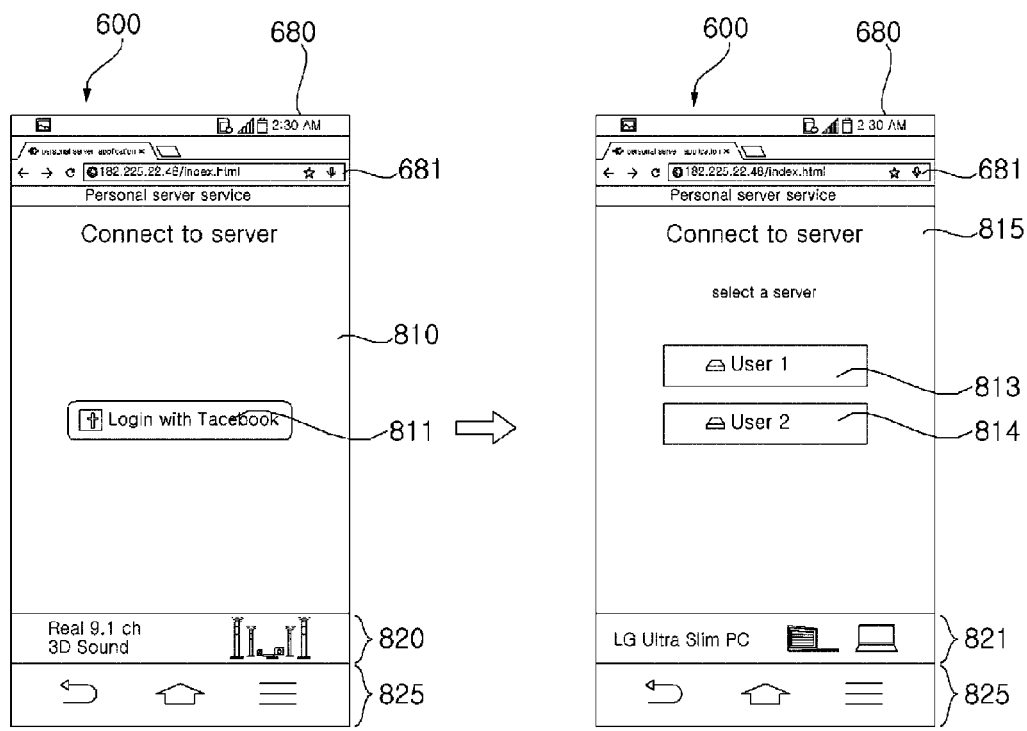

FIG. 10B is a view illustrating that a personal server list screen is displayed on the terminal 600 by login on the server access screen 810.

In a case in which a login window is displayed using the login object 811, login information may be input to the terminal 600, and the terminal 600 may transmit the input login information to the home device access server 500.

The home device access server 500 may transmit personal server list information to the terminal 600, and the terminal 600 may display a personal server list screen 815 using the received personal server list information as shown in FIG. 10B.

That is, the terminal 600 may display a personal server list after login to the home device access server 500.

FIG. 10B illustrates that the personal server list is divided into "User 1" 813 and "User 2" 814. The personal server list is a server list that is capable of sharing a home device list which can managed by a login user. The personal server list may be applicable to a personal server of the login user. In addition, the personal server list may be applicable to a personal server of another user.

For example, in a case in which information regarding a personal server of another user is set to be shared by the login user, a personal server list of another user may be displayed in the personal server list screen 815.

On the other hand, the terminal 600 may further receive advertisement information from the home device access server 500 in addition to the personal server list information. In this case, an advertisement screen 821 may be displayed together with the personal server list screen 815. When a specific advertisement item is selected on the advertisement screen 821, an advertisement web page may be displayed.

Meanwhile, the advertisement screen 820 of FIG. 10A, which is an advertisement screen before login to the home device access server 500, and the advertisement screen 821 of FIG. 10B, which is an advertisement screen after login to the home device access server 500, may be different from each other. In particular, the home device access server 500 may provide customized advertisement information to the user after login.

Figure 10C:
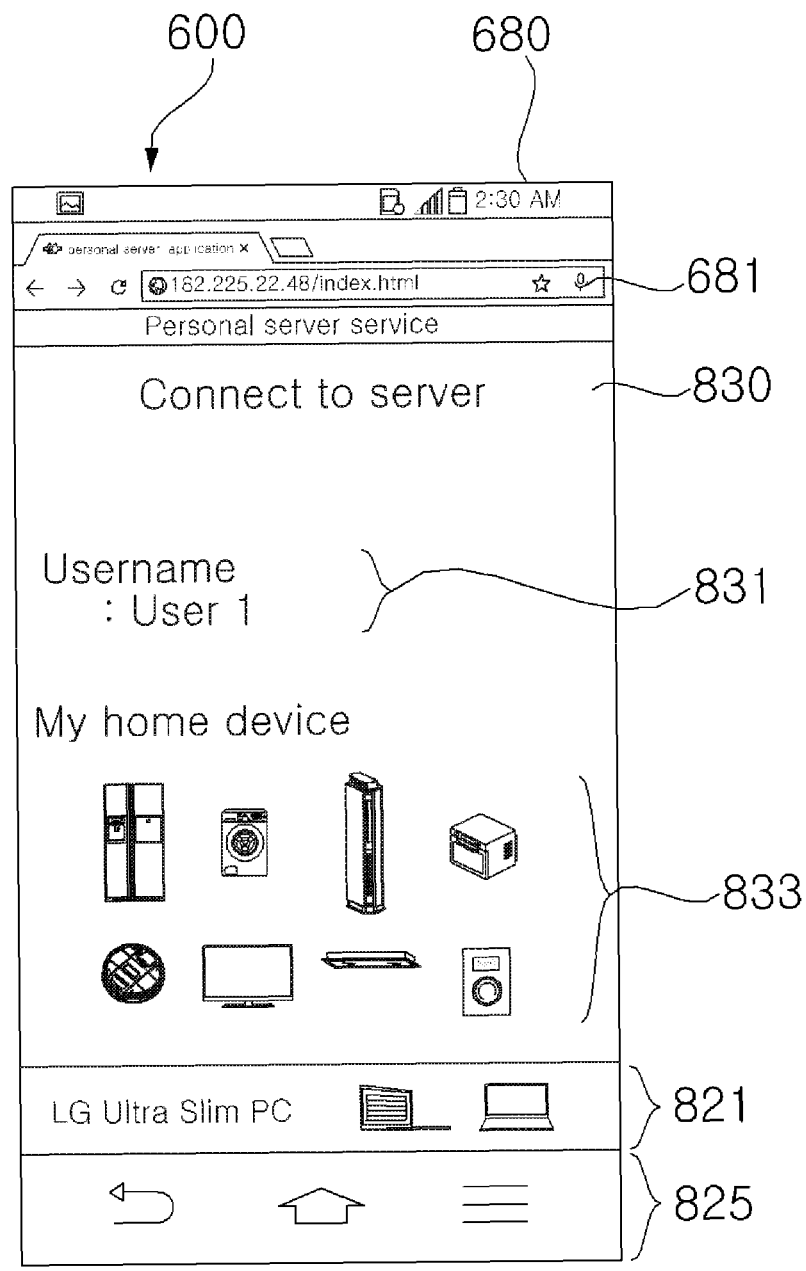

FIG. 10C is a view illustrating that a specific personal server is selected on the server access screen 810, and a home device list screen 830 which can be managed by the personal server is displayed on the terminal 600.

When "User 1" 813 is selected in FIG. 10B, the terminal 600 may request information regarding the personal server corresponding to "User 1" from the home device access server 500. The home device access server 500 may transmit network information of the personal server corresponding to "User 1" to the terminal in response to the personal server request. In addition, the home device access server 500 may further transmit device information and account ID information of the personal server to the terminal 600.

The terminal 600 may access the personal server corresponding to "User 1" using the network information of the personal server corresponding to "User 1" and receive a shared home device list 833 from the personal server corresponding to "User 1".

In addition, the terminal 600 may display a home device list screen 830 including the shared home device list 833 on the display 680. As a result, it is possible to easily and conveniently confirm a home device list including home device items which can be managed by the personal server through the terminal 600.

At this time, the shared home device list 833 may include thumbnail images indicating the home device items which can be managed by the personal server. FIG. 10C illustrates thumbnail images for a refrigerator, a washer, an air conditioner, a cooker, a robot cleaner, a TV, a lighting device, and a temperature controller, which can be managed by the personal server.

On the other hand, the home device list 833 may further include ON/OFF information of the respective home device items unlike in the figure.

The home device list screen 830 may further include personal server name information 831 in addition to the shared home device list 833.

The terminal 600 may display the advertisement screen 821 including the advertisement information received from the home device access server 500 together with the home device list screen 830.

Figure 10D:
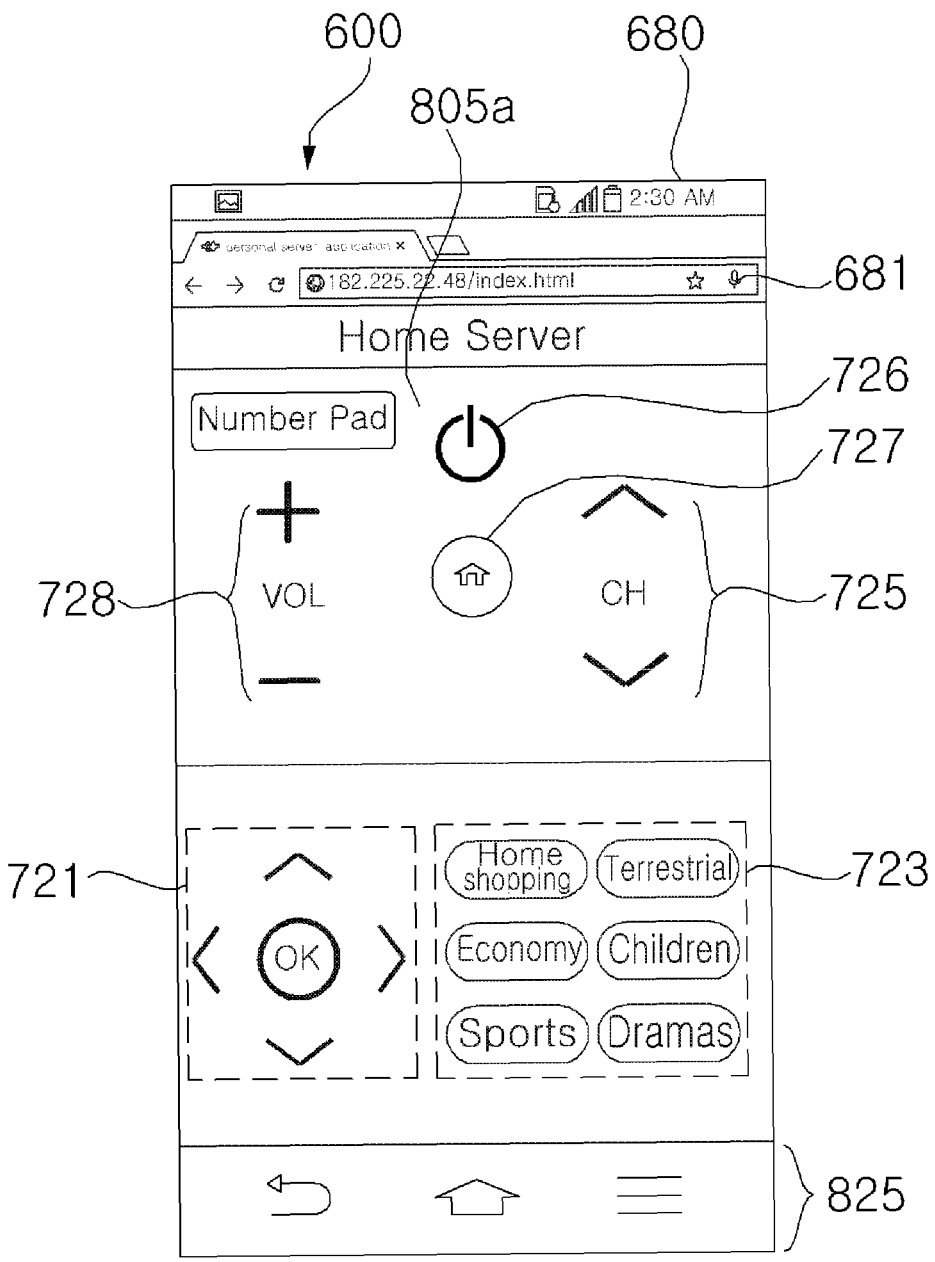
Figure 10E:
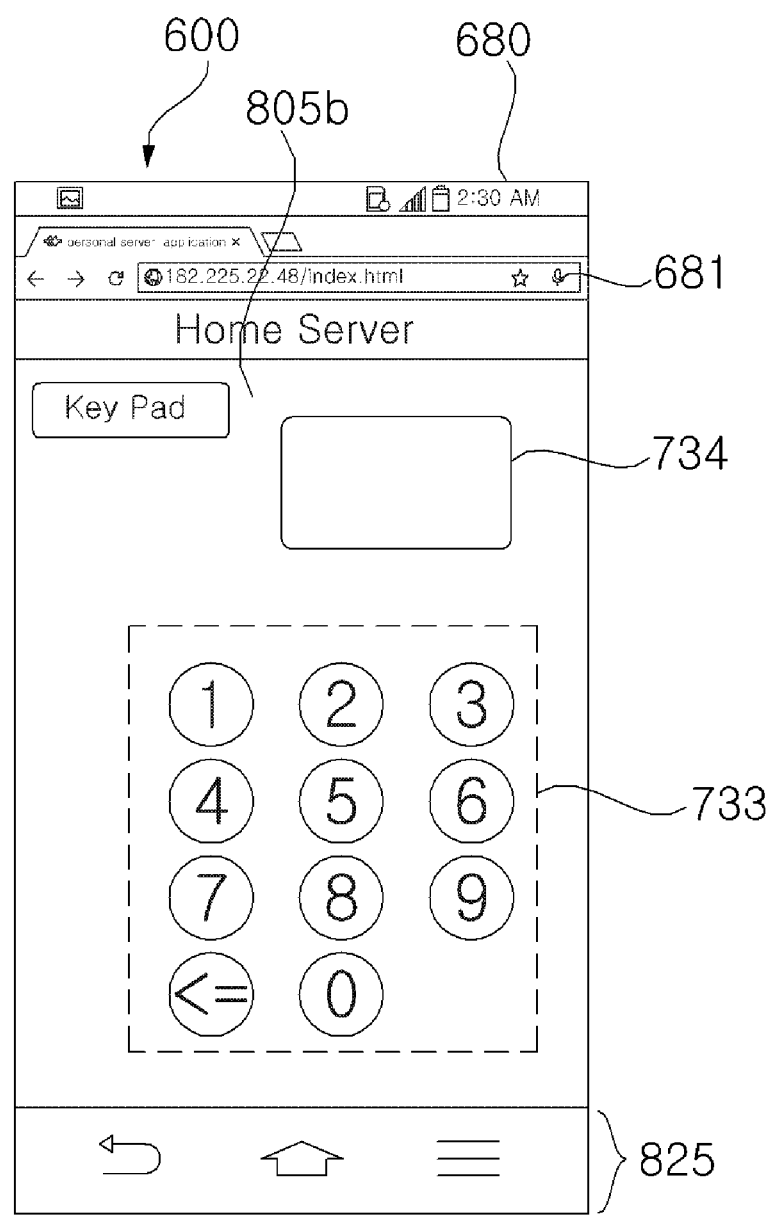

Meanwhile, in a case in which the TV item is selected from the home device list 833 of FIG. 10C, a TV remote control screen 805a or 805b may be displayed as shown in FIG. 10D or 10E.

The TV remote control screen may be provided by the personal server 50. The terminal 600 may receive and display the TV remote control screen.

The TV remote control screen 805a of FIG. 10D includes volume keys 728, channel keys 725, a power key 726, a home key 717, direction keys 721, and broadcast kind keys 723. It is possible for the user to perform a desired remote control operation, such as channel adjustment, volume adjustment, and power adjustment, through the TV remote control screen 805a.

The TV remote control screen 805b of FIG. 10E includes a keypad 734 and number keys 733. Channel adjustment may be performed by inputting numbers, and a pointer may be moved using the keypad.

Meanwhile, although not shown, various other items, such as a recording setting item, a schedule recording setting item, and a broadcast stream setting item for watching a current broadcast through the terminal, may be further displayed on the TV remote control screen 805a or 805b shown in FIG. 10D or 10E.

Furthermore, although not shown, various kinds of TV operation state information, such as broadcast channel information of a current broadcast watched through the TV, accumulated TV watching time information for a predetermined period of time, accumulated watched channel information for a predetermined period of time, accumulated watched program information, and power consumption information, may be further displayed on the TV remote control screen 805a or 805b shown in FIG. 10D or 10E. Consequently, it is possible for the user to confirm various kinds of information through the terminal 600 and to transmit a remote control command based on the information.

In addition, a downscaled video corresponding to a video of a broadcast channel which is being currently watched may also be displayed on the TV remote control screen 805a or 805b shown in FIG. 10D or 10E. The downscaled video may be streamed by the personal server 50, i.e. the video provision apparatus, and received by the terminal 600.

In another example, in a case in which the refrigerator item is selected from the home device list 833 of FIG. 10C, a refrigerator remote control screen may be displayed.

The refrigerator remote control screen may include various setting items, such as a freezer compartment temperature setting item, a refrigerator compartment temperature setting item, a rapid cooling setting item, and a deodorization function setting item, of the refrigerator.

In addition, the refrigerator remote control screen may further include various kinds of operation state information, such as freezer compartment temperature information, refrigerator compartment temperature information, failure information, list information of food stored in the refrigerator, expiration information of food stored in the refrigerator, kind information of food to be bought, smart diagnosis information, and power consumption information, of the refrigerator.

Consequently, it is possible for the user to remotely control the refrigerator while confirming the state information of the refrigerator through the refrigerator remote control screen.

In another example, in a case in which the washer item is selected from the home device list 833 of FIG. 10C, a washer remote control screen for controlling the washer may be displayed.

The washer remote control screen may include a power on/off setting item, a washing/rinsing/spin-drying time setting item, a washing/rinsing/spin-drying course setting item, and a schedule operation setting item.

In addition, the washer remote control screen may further include various kinds of operation state information, such as washing/rinsing/spin-drying state information, failure information, smart diagnosis information, and power consumption information, of the washer.

Consequently, it is possible for the user to remotely control the washer while confirming the state information of the washer through the washer remote control screen.

In another example, in a case in which the air conditioner item is selected from the home device list 833 of FIG. 10C, an air conditioner remote control screen for controlling the air conditioner may be displayed.

The air conditioner remote control screen may include various setting items, such as a power on/off setting item, a temperature setting item, a wind direction setting item, a wind speed setting item, an operation time setting item, a washing/rinsing/spin-drying course setting item, and a schedule operation time setting item, of the air conditioner.

In addition, the air conditioner remote control screen may further include various kinds of operation state information, such as surrounding temperature information, target temperature information, information regarding the number of people in a room, information regarding the area of the room, air conditioner operation time information, failure information, smart diagnosis information, and power consumption information, of the air conditioner.

Consequently, it is possible for the user to remotely control the air conditioner while confirming the state information of the air conditioner through the air conditioner remote control screen.

In another example, in a case in which the cooker item is selected from the home device list 833 of FIG. 10C, a cooker remote control screen for controlling the cooker may be displayed.

The cooker remote control screen may include various setting items, such as a power on/off setting item, an operation time setting item, a cooking course setting item, and a schedule cooking time setting item, of the cooker.

In addition, the cooker remote control screen may further include various kinds of operation state information, such as operation time information, failure information, smart diagnosis information, and power consumption information, of the cooker.

Consequently, it is possible for the user to remotely control the cooker while confirming the state information of the cooker through the cooker remote control screen.

In another example, in a case in which the robot cleaner item is selected from the home device list 833 of FIG. 10C, a robot cleaner remote control screen for controlling the robot cleaner may be displayed.

The robot cleaner remote control screen may include various setting items, such as a power on/off setting item, a travel path setting item, an operation time setting item, a cleaning course setting item, a fan speed setting item, a schedule operation time setting item, and a camera-based image transmission setting item, of the robot cleaner.

In addition, the robot cleaner remote control screen may further include various kinds of operation state information, such as operation time information, failure information, smart diagnosis information, and power consumption information, of the robot cleaner.

Consequently, it is possible for the user to remotely control the robot cleaner while confirming the state information of the robot cleaner through the robot cleaner remote control screen.

In another example, in a case in which the lighting device item is selected from the home device list 833 of FIG. 10C, a lighting device remote control screen for controlling the lighting device may be displayed.

The lighting device remote control screen may include various setting items, such as a power on/off setting item, a lighting intensity setting item, a lighting color setting item, an operation time setting item, and a schedule operation time setting item, of the lighting device.

In addition, the lighting device remote control screen may further include various kinds of operation state information, such as operation time information, failure information, smart diagnosis information, and power consumption information, of the lighting device.

Consequently, it is possible for the user to remotely control the lighting device while confirming the state information of the lighting device through the lighting device remote control screen.

In a further example, in a case in which the temperature controller item is selected from the home device list 833 of FIG. 10C, a temperature controller remote control screen for controlling the temperature controller may be displayed.

The temperature controller remote control screen may include various setting items, such as a power on/off setting item, a temperature setting item, an operation time setting item, and a schedule operation time setting item, of the temperature controller.

In addition, the temperature controller remote control screen may further include various kinds of operation state information, such as operation time information, failure information, smart diagnosis information, and power consumption information, of the temperature controller, of the temperature controller.

Consequently, it is possible for the user to remotely control the temperature controller while confirming the state information of the temperature controller through the temperature controller remote control screen.

On the other hand, in a case in which a plurality of home devices is selected from the home device list 833 of FIG. 10C, the terminal 600 may simultaneously display a plurality of remote control screens for the selected home devices on the display. As a result, user convenience may be improved.

Meanwhile, upon receiving a remote control command from the terminal 600, the personal server 50 may perform pattern analysis for the received remote control command to provide a customized function, which will hereinafter be described with reference to FIGS. 11A to 11C.

Figure 11A:
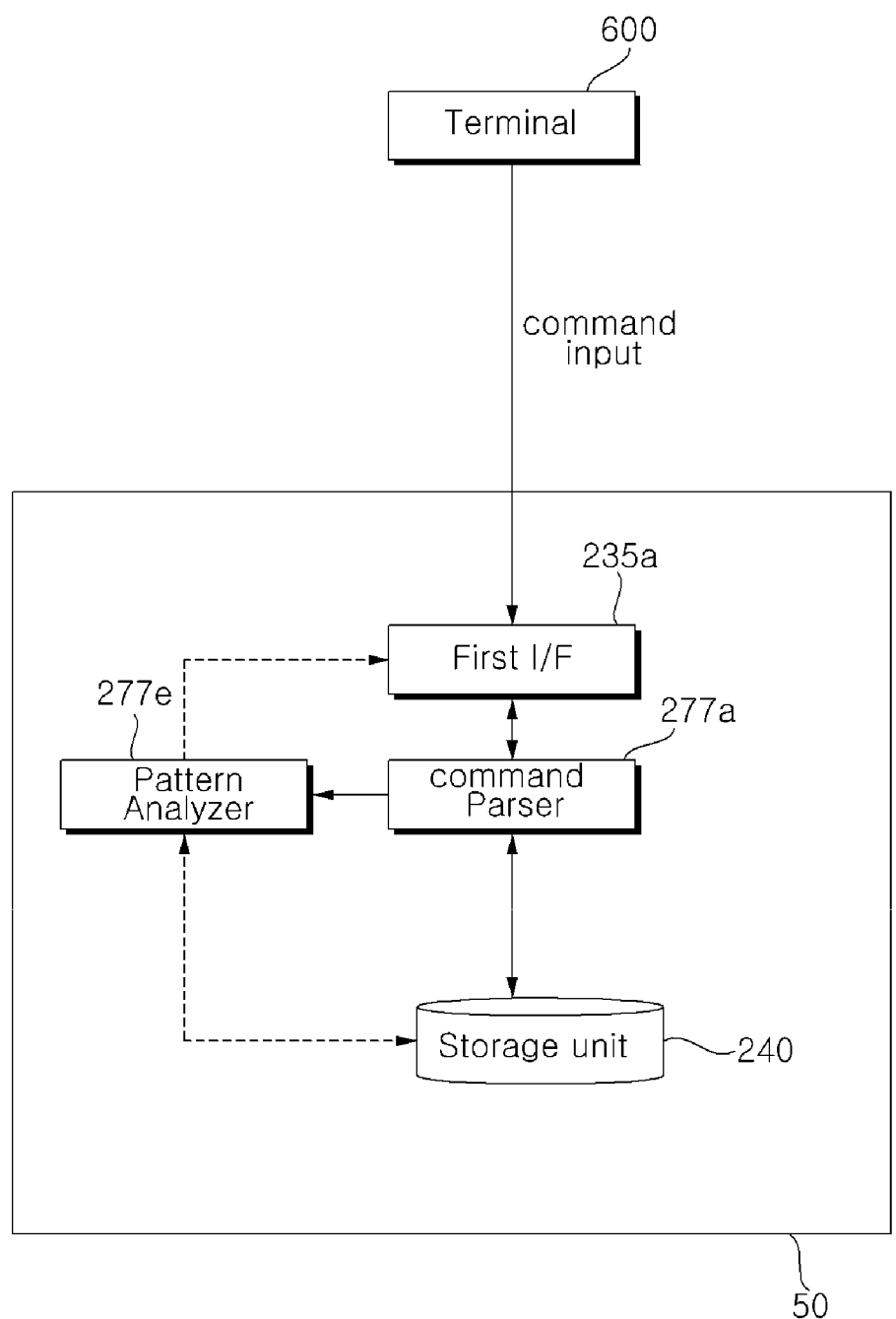

Referring to FIG. 11A, the remote control command from the terminal 600 is analyzed by the command parser 277a, and the parsed remote control command is transferred to the pattern analyzer 277e.

The pattern analyzer 277e memorizes a user command which is repeatedly issued by a user more than a predetermined number of times. In a case in which the user issues the same command, therefore, the pattern analyzer 277e recommends the memorized command.

Figure 11B:
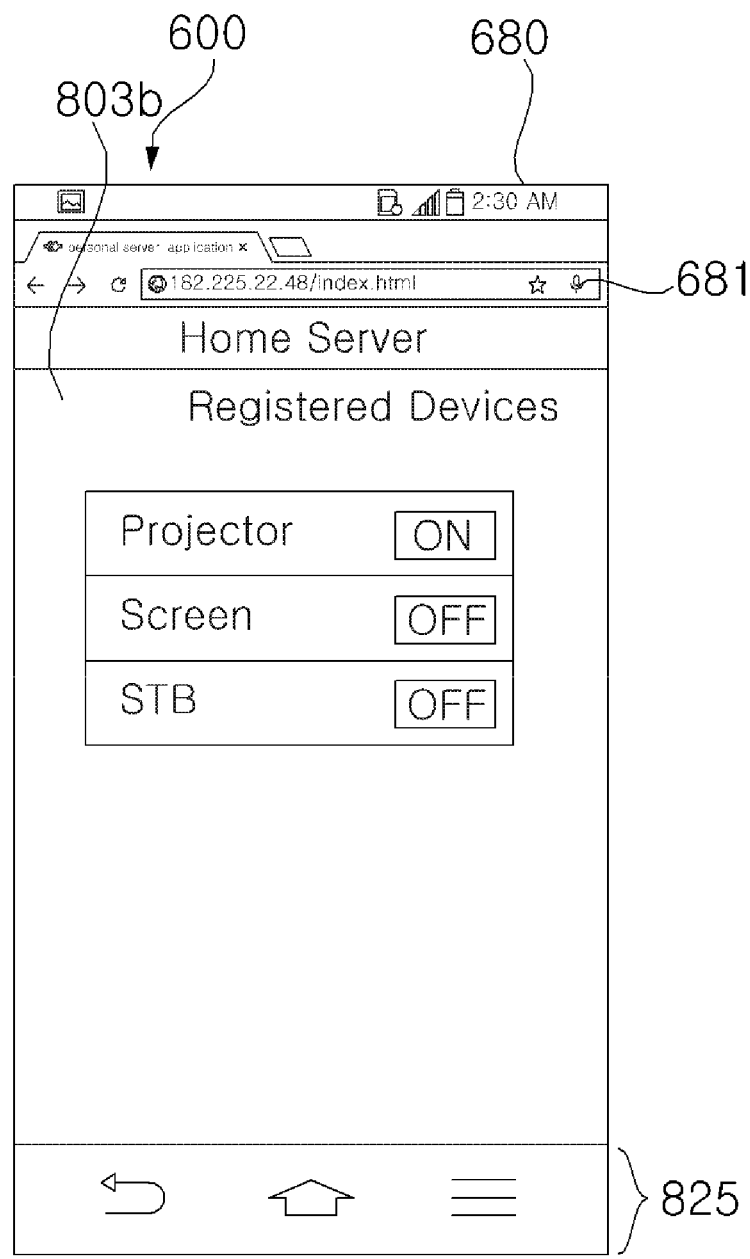
Figure 11C:
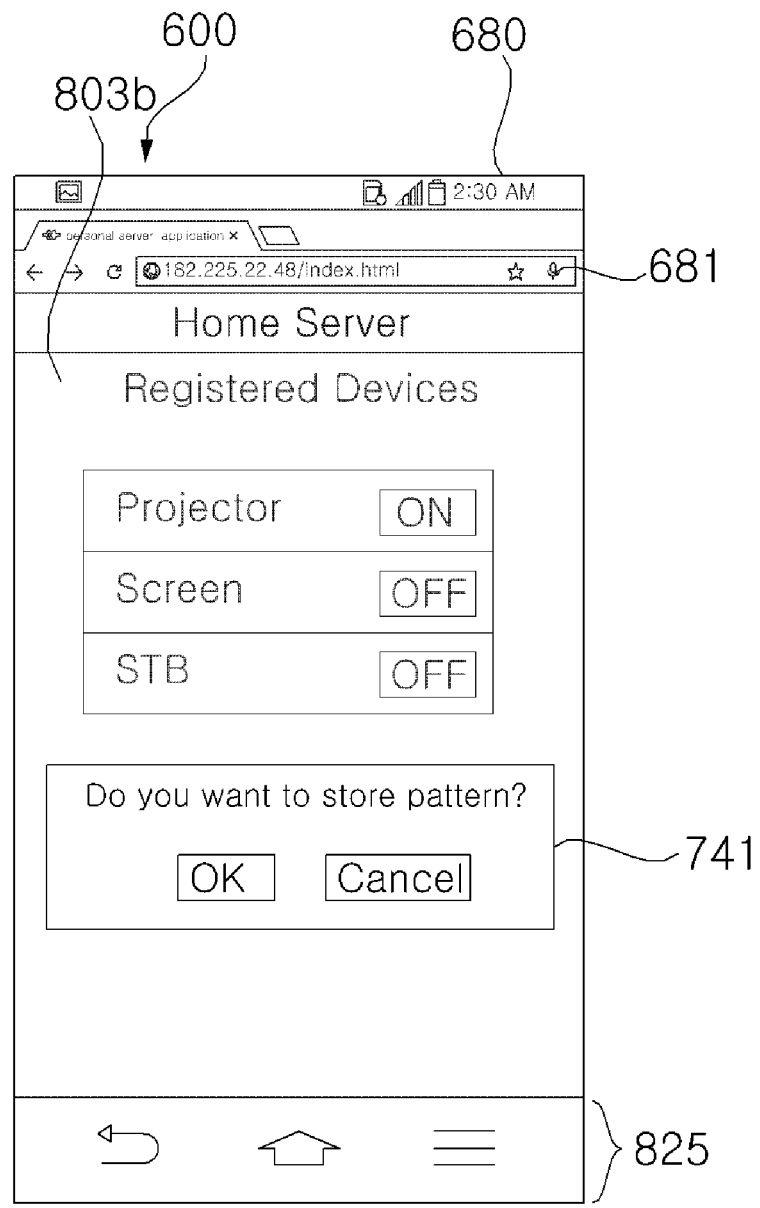

For example, in a case in which the terminal 600 transmits a remote control command for projector on, screen off, and settop box off to the personal server 50 more than a predetermined number of times on a remote control screen 803b as shown in FIG. 11B, the pattern analyzer 277e of the personal server 50 analyzes a pattern of the remote control command, and controls the command pattern to be stored in the storage unit 240.

The stored command pattern may be transmitted to the terminal 600 via the first interface unit 235a. The terminal 600 may display an object 741 indicating whether to store the received command pattern information as shown in FIG. 11C. Consequently, the terminal 600 may also easily and conveniently store the repeated command pattern.

Meanwhile, in a state in which the TV remote control screen 805a is displayed on the terminal 600, channels which are frequently watched may be grouped such that only the grouped channels can be watched.

Figure 12A:
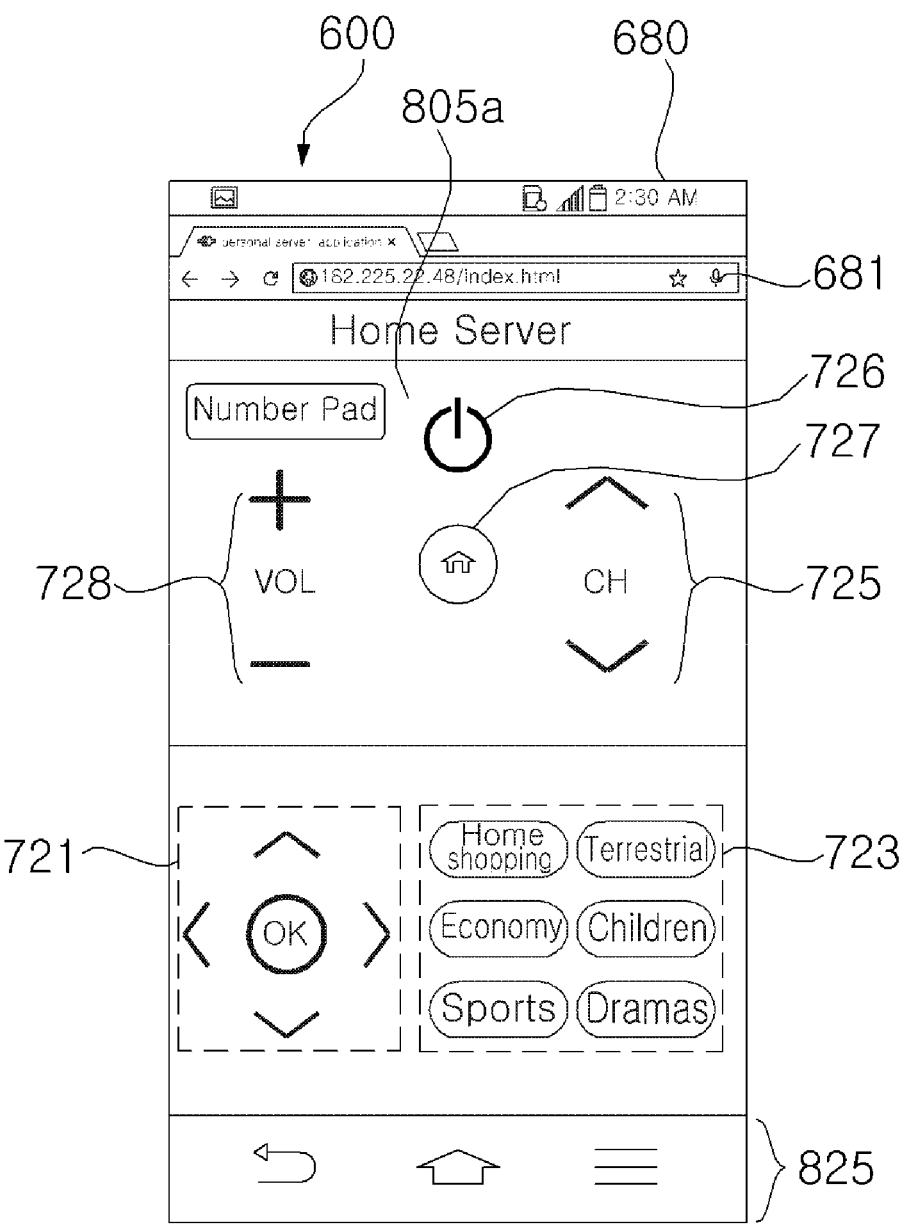

That is, as shown in FIG. 12A, some of the broadcast kind keys 723, e.g. "home shopping," "economy," "sports," "terrestrial," "children," and "dramas," may be grouped in a state in which the TV remote control screen 805a is displayed on the terminal 600.

Figure 12B:
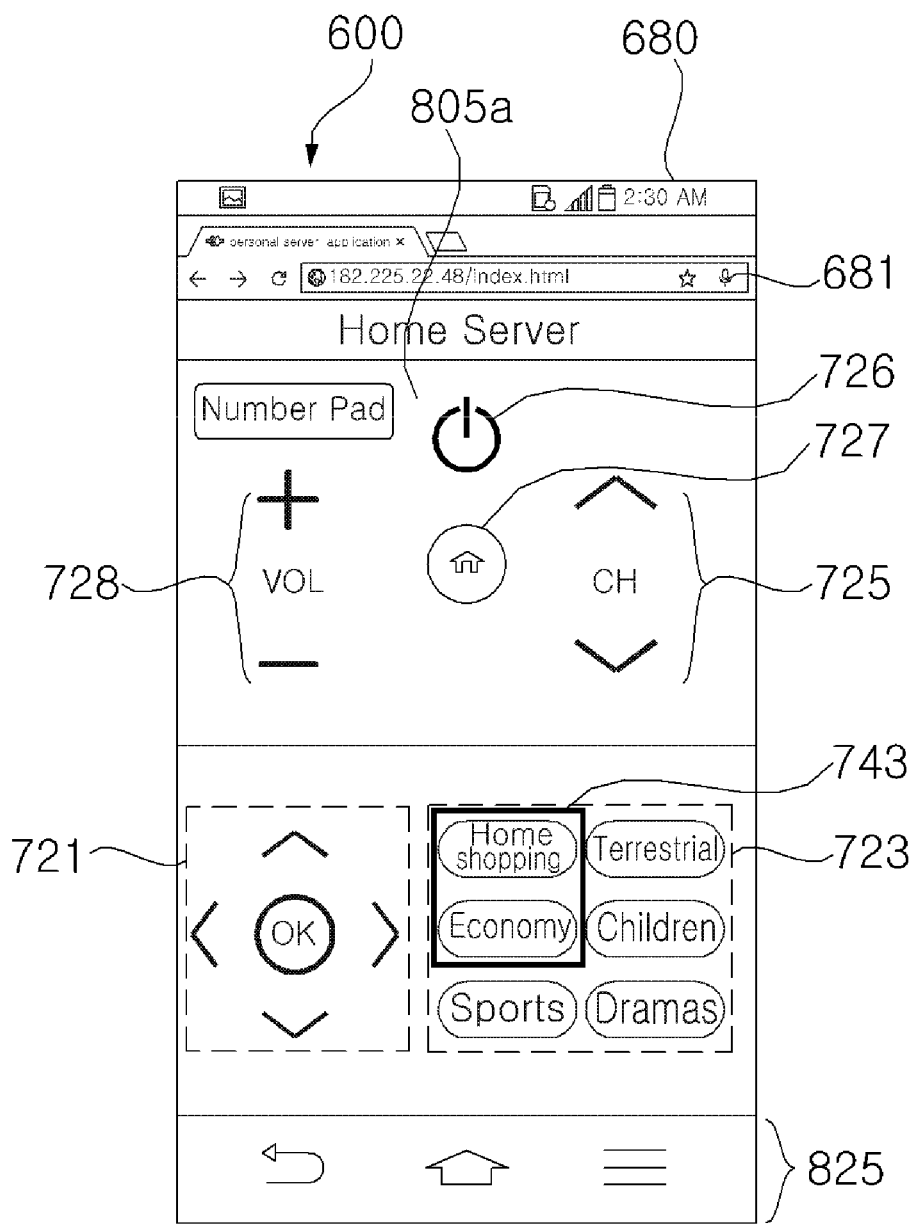

For example, as shown in FIG. 12B, a zone 743 including "home shopping" and "economy" of the broadcast kind keys 723 may be grouped and designated.

In this case, when the channel keys 725 are manipulated, channel switch may be performed only for channels related to "home shopping" and "economy."

The grouping command and the channel switch command may be transferred from the terminal 600 to the TV 60f via the personal server 500.

Meanwhile, as previously described, the personal server 50 may be embodied as a video provision apparatus. Hereinafter, the operation of the personal server 50 that is capable of providing a video will be described with reference to FIGS. 13A to 14B.

Figure 13A:
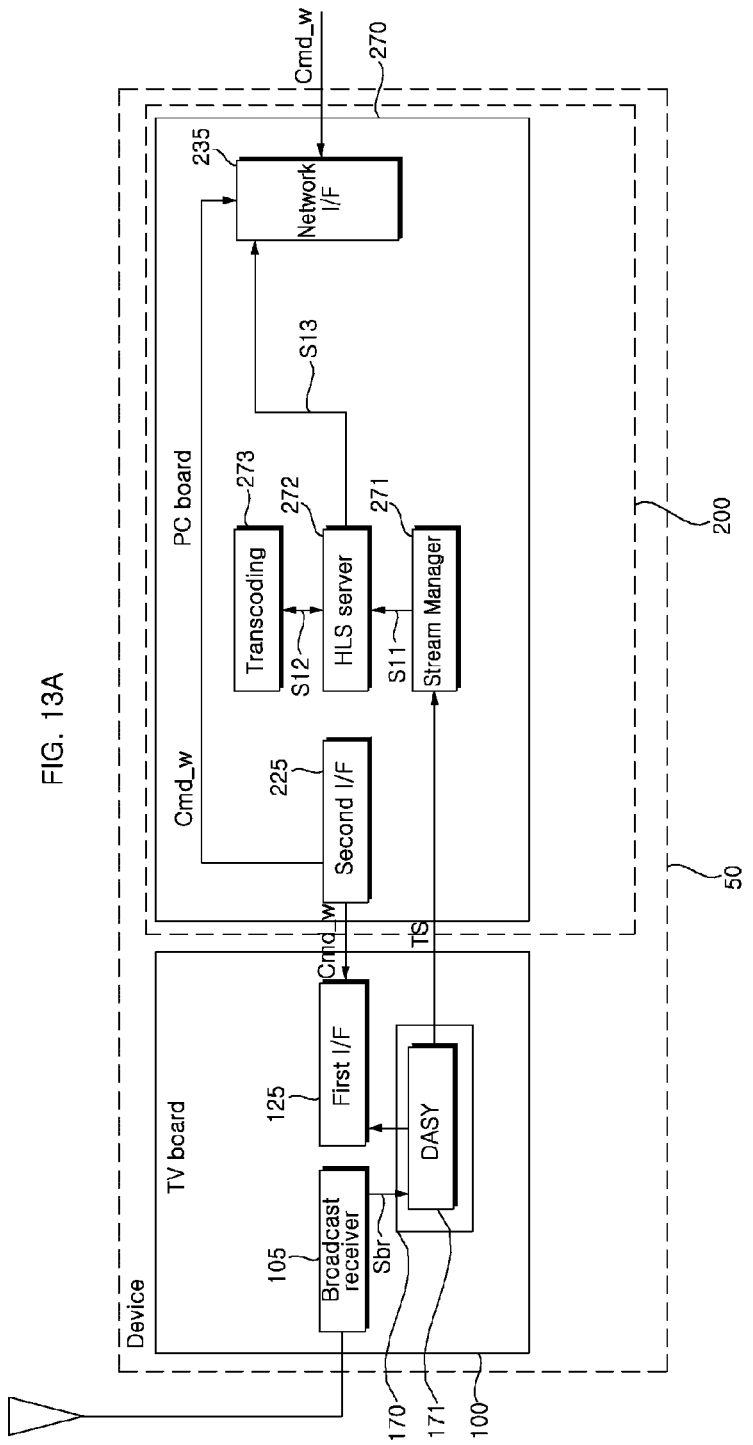

FIG. 13A illustrates an example of signal processing performed by the personal server 50 upon receiving a live broadcast watching command from the terminal 600.

Upon receiving a broadcast watching command Cmd_w from the terminal 600, the network interface unit 235 transfers the broadcast watching command Cmd_w to the second interface unit 225. The broadcast watching command Cmd_w is transferred to the second processor 270. Consequently, the broadcast reception unit 105 receives a broadcast signal Sbr of a channel corresponding to the broadcast watching command Cmd_w. The received broadcast signal Sbr is transferred to the first processor 170.

A DASY 171 of the first processor 170 converts the broadcast signal Sbr into a transport stream (TS), which is transferred to a stream manager 271 of the second processor 270. The stream manager 271 reconfigures the stream (TS) and transfers the reconfigured stream S11 to a streaming server 272. The streaming server 272 transmits the stream S12 to a transcoder 273. The transcoder 273 transcodes the stream into the form of a file suitable for the terminal 600. The streaming server 272 transmits the transcoded stream S13 to the network interface unit 235. The network interface unit 235 transmits the transcoded stream S13 to the terminal 600.

Figure 13B:
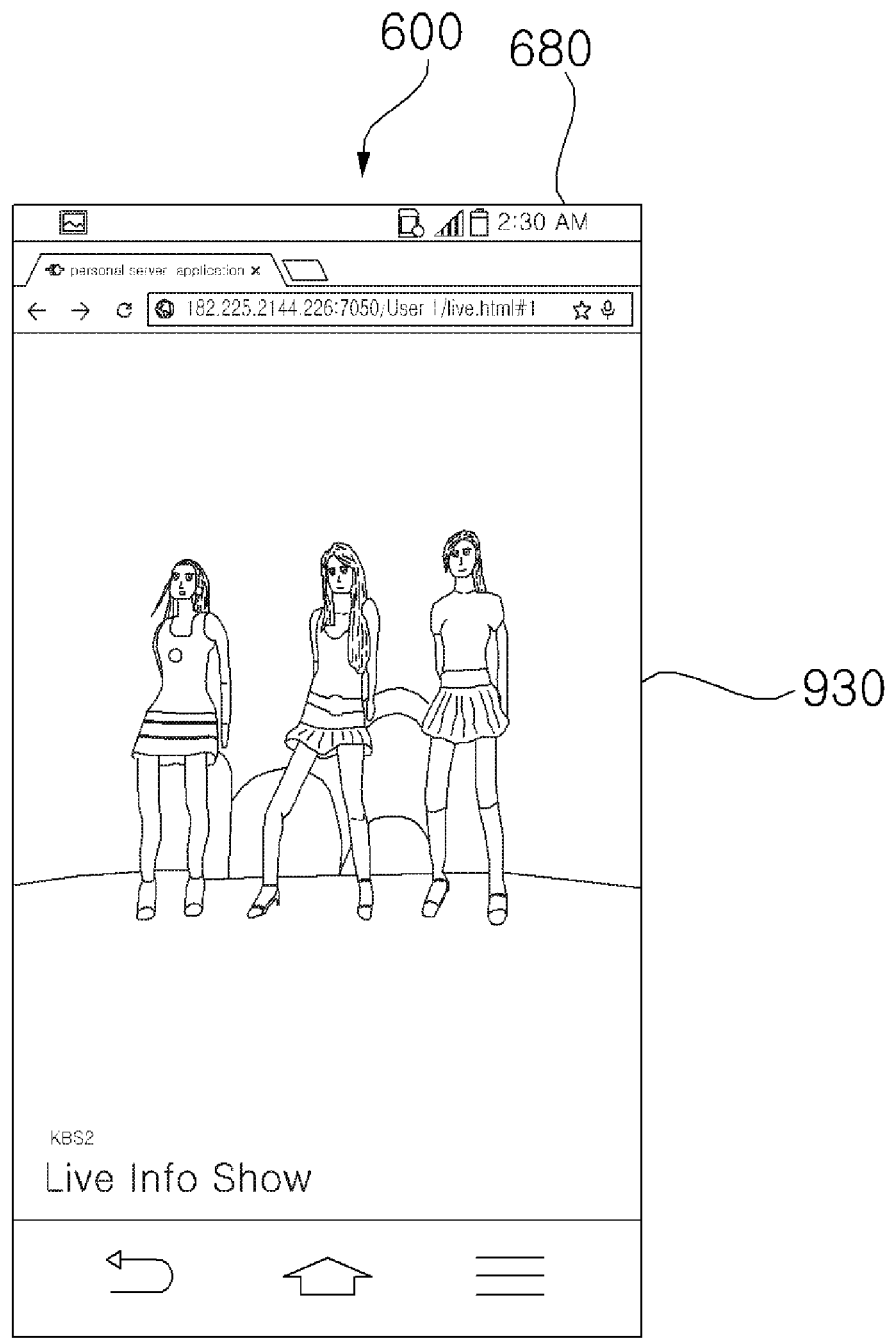

As shown in FIG. 13B, therefore, a broadcast video 930 of the corresponding broadcast may be reproduced on the display 680 of the terminal 600.

Figure 14A:
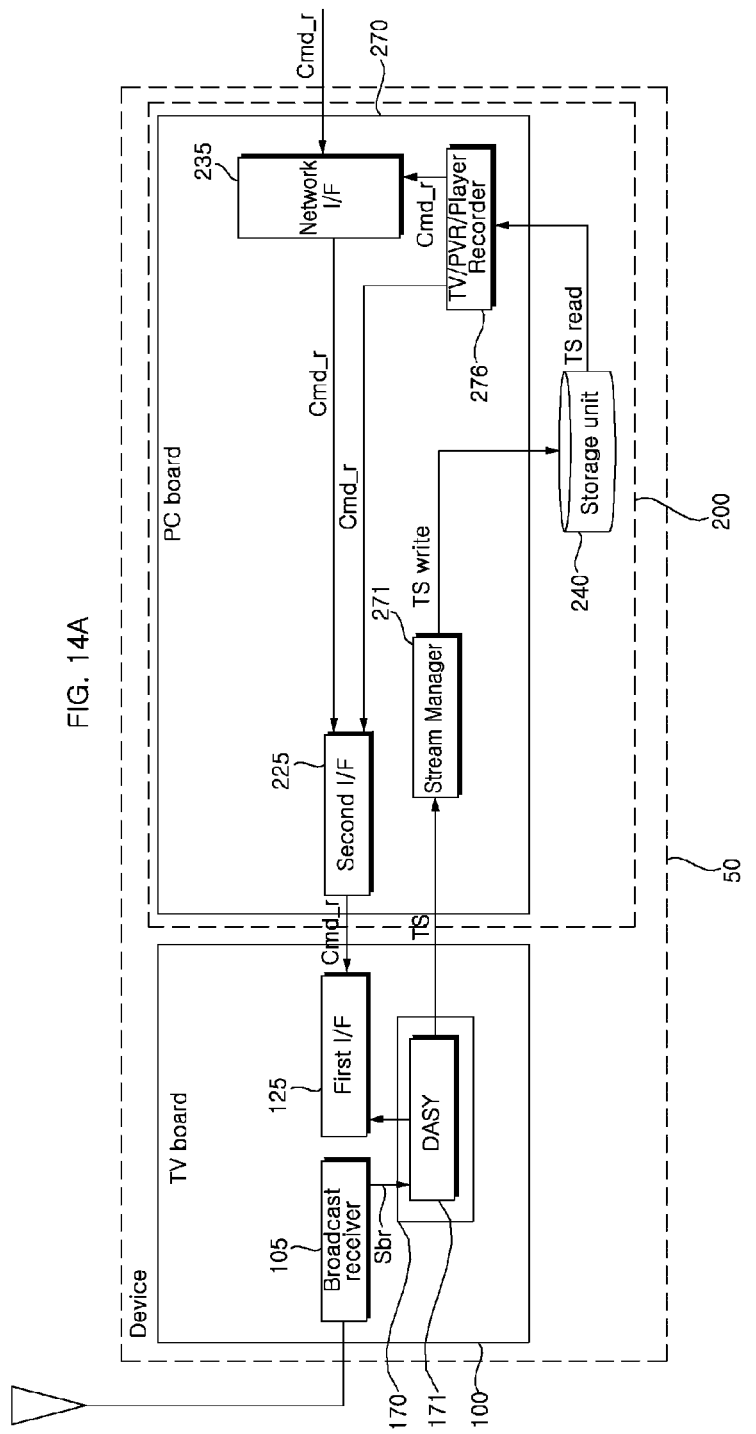

FIG. 14A illustrates an example of signal processing performed by the personal server 50 upon receiving a broadcast recording command from the terminal 600.

Upon receiving a broadcast recording command Cmd_r from the terminal 600, the network interface unit 235 transfers the broadcast recording command Cmd_r to the second interface unit 225. The broadcast recording command Cmd_r is transferred to the first processor 170 via the first interface unit 125. Consequently, the broadcast reception unit 105 receives a broadcast signal Sbr of a channel corresponding to the broadcast recording command Cmd_r. The received broadcast signal Sbr is transferred to the first processor 170.

The DASY 171 of the first processor 170 converts the broadcast signal Sbr into a transport stream (TS), which is transferred to the stream manager 271 of the second processor 270. The stream manager 271 reconfigures the stream (TS) and controls the reconfigured stream TS write to be stored in the storage unit 240.

Upon receiving a broadcast reproduction command for the recorded broadcast, a reproduction unit 276 reads a stream TS read from the storage unit 240 to reproduce the broadcast.

Upon receiving a broadcast recording command Cmd_r from the terminal 600, on the other hand, the reproduction unit 276 may transmit a command cmd to transfer the broadcast recording command Cmd_r to the second interface unit 225.

Figure 14B:
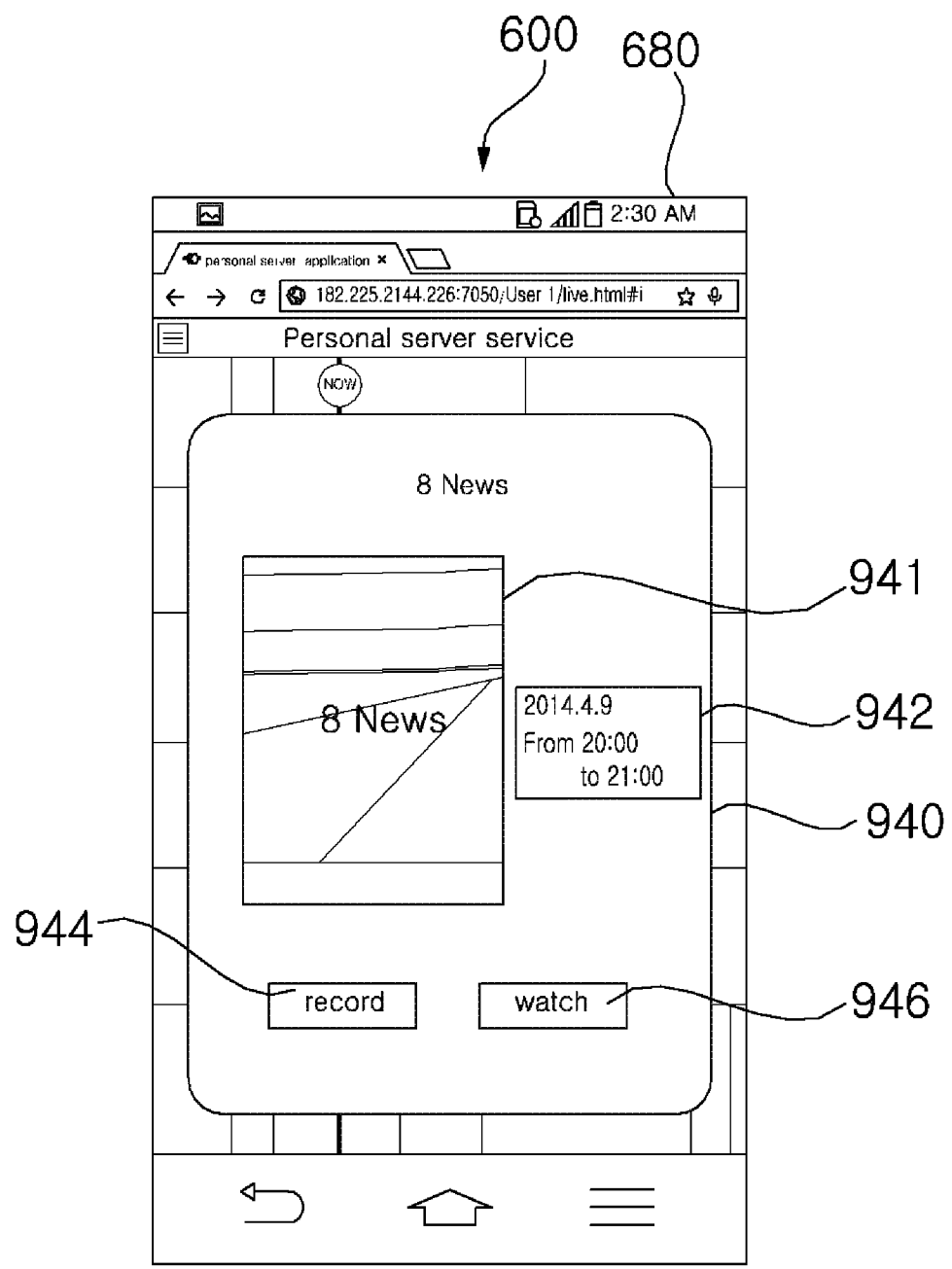

FIG. 14B illustrates that a broadcast-related thumbnail image 941, broadcast time information 942, a "record" item 944, and a "watch" item 946 are included in a detailed broadcast information screen 940. The "watch" item 946 may be disabled or scheduled.

When the "record" item 944 is selected, schedule recording setting may be performed. Consequently, the terminal 600 transmits a schedule recording request for a corresponding broadcast to the personal server 50. The personal server 50 performs schedule recording in response to the schedule recording request.

As is apparent from the above description, a server according to an embodiment of the present invention stores product information and network information of at least one home device, provides a home device list for the at least one home device according to an access request from a terminal operating a web browser, and, upon receiving an access request for any one home device selected from the home device list, provides the network information of the selected home device to the terminal. Consequently, it is possible to easily and conveniently remotely control the home device through the terminal.

In particular, the server receives an access request from the terminal in response to selection of a personal server item on a web screen displayed in response to the web browser operated by the terminal, transmits home device list information including the product information and the network information of the at least one home device to the terminal when the terminal accesses the server, and, upon receiving an access request for any one home device selected from the home device list, transmits the network information of the selected home device to the terminal. Consequently, it is possible to easily and conveniently remotely control the home device through the terminal.

A home device access server according to an embodiment of the present invention receives an access request from a terminal in response to a web address input to a web screen displayed in response to a web browser operated by the terminal, controls personal server list information corresponding to login information from the terminal to be transmitted to the terminal, and, upon receiving a request for information regarding a specific personal server selected from the personal server list from the terminal, transmits network information of the personal server to the terminal. Consequently, it is possible to easily and conveniently remotely control the home device through the terminal.

A terminal according to an embodiment of the present invention operates a web browser to remotely control a home device instead of operating an additional application and, when a web address for accessing a home device access server is input to a web screen, transmits an access request to the home device access server. The terminal may receive information corresponding to the access request from the home device access server and display a personal server access screen. After login, the terminal may display a home device list screen and, when any one home device is selected from the home device list, remotely control the selected home device. Consequently, it is possible to easily and conveniently remotely control the home device using the web browser without installation of an additional application.

A home device remote control system according to an embodiment of the present invention includes a terminal, a home device access server to receive an access request from the terminal in response to a web address input to the terminal, controlling personal server list information corresponding to login information from the terminal to be transmitted to the terminal, and, upon receiving a request for information regarding a specific personal server selected from the personal server list from the terminal, to transmit network information of the personal server to the terminal, and a server to store product information and network information of at least one home device, to provide a home device list for the at least one home device according to an access request from the terminal, and, upon receiving an access request for any one home device selected from the home device list, to provide the network information of the selected home device to the terminal. Consequently, it is possible to easily and conveniently remotely control the home device through the terminal.

Meanwhile, the operation methods of the server, the home device access server, the terminal, and the home device remote control system may be implemented as code that can be written on a processor-readable recording medium and thus read by a processor provided in each device. The processor-readable recording medium may be any type of recording device in which data is stored in a processor-readable manner. The processor-readable recording medium may include, for example, a read only memory (ROM), a random access memory (RAM), a compact disk read only memory (CD-ROM), a magnetic tape, a floppy disk, and an optical data storage device and may be implemented in the form of a carrier wave transmitted over the Internet. In addition, the processor-readable recording medium can be distributed over a plurality of computer systems connected to a network such that processor-readable code is written thereto and executed therefrom in a distribution manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A server comprising:
a first interface to exchange data with a terminal;
a second interface to exchange data with a home device access server;
a third interface to receive home device list information including product information and network information of at least one home device;
a broadcast receptor to receive a broadcast signal;
a storage to store the home device list information; and
a processor to control:
transmitting server information to the home device access server via the second interface, wherein server list information and network information of the server is generated based on the server information;
receiving an access request from the terminal in response to a selection of a specific server item from the server list information on a web screen displayed from a web browser operated by the terminal,
transmitting the home device list information to the terminal when the terminal accesses the server, and
upon receiving an access request for a selected home device via the third interface, transmitting the network information of the selected home device to the terminal via the first interface,
wherein the processor includes:
a command parser to parse a remote control command from the terminal;
a command transmitter to transmit the parsed command;
a device manager to control the command parser and the command transmitter;
and
a pattern analyzer to analyze a pattern of the remote control command received from the terminal
wherein:
the storage stores content containing a broadcast video, and
when the terminal remotely accesses the server, the processor controls a shared content list stored in the storage to be transmitted to the terminal according to a request by the terminal and, if a specific content item is selected from the shared content list, controls the selected content item to be transmitted to the terminal.

2. The server according to claim 1, wherein
the third interface further receives product information and network information of an added home device, and
the processor controls the product information and the network information of the added home device to be added to a home device list and to be stored in the storage.

3. The server according to claim 1, wherein the processor controls the product information of the at least one home device to be transmitted to the home device access server via the second interface.

4. The server according to claim 1, wherein the processor controls the network information of the server to be transmitted to the home device access server whenever the server is powered on.

5. The server according to claim 1, wherein
upon receiving a broadcast recording command from the terminal, the processor controls the broadcast receptor to receive a broadcast signal of a corresponding channel in response to the broadcast recording command, and controls a stream corresponding to the broadcast signal to be stored in the storage, and upon receiving a broadcast watching command from the terminal, the processor controls the broadcast receptor to receive a broadcast signal of a corresponding channel in response to the broadcast watching command, transcodes a stream corresponding to the broadcast signal, and controls the transcoded stream to be transmitted to the terminal via the first interface.

6. The server according to claim 1, further including:
a second processor to control the broadcast receptor, wherein the processor operates a first operating system (OS) different from a second OS operated by the second processor.

* * * * *